United States Patent
Dou et al.

(10) Patent No.: US 12,057,576 B2
(45) Date of Patent: Aug. 6, 2024

(54) POSITIVE ELECTRODE ACTIVE MATERIAL AND PREPARATION METHOD THEREOF, POSITIVE ELECTRODE PLATE, LITHIUM-ION SECONDARY BATTERY, AND APPARATUS CONTAINING SUCH LITHIUM-ION SECONDARY BATTERY

(71) Applicant: CONTEMPORARY AMPEREX TECHNOLOGY CO., LIMITED, Ningde (CN)

(72) Inventors: Shushi Dou, Ningde (CN); Chunhua Hu, Ningde (CN); Yao Jiang, Ningde (CN); Qi Wu, Ningde (CN); Jinhua He, Ningde (CN); Bin Deng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 238 days.

(21) Appl. No.: 17/682,057

(22) Filed: Feb. 28, 2022

(65) Prior Publication Data
US 2022/0181622 A1    Jun. 9, 2022

Related U.S. Application Data

(63) Continuation of application No. PCT/CN2020/112913, filed on Sep. 1, 2020.

(30) Foreign Application Priority Data

Sep. 2, 2019 (CN) .......................... 201910845574.1

(51) Int. Cl.
*H01M 4/525* (2010.01)
*H01M 4/131* (2010.01)
(Continued)

(52) U.S. Cl.
CPC ........... *H01M 4/525* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

| | | |
|---|---|---|
| 2013/0260231 A1 | 10/2013 | Hua et al. |
| 2016/0336595 A1 | 11/2016 | Choi et al. |
| 2017/0155146 A1 | 6/2017 | Lee et al. |

FOREIGN PATENT DOCUMENTS

| | | |
|---|---|---|
| CN | 103825028 A | 5/2014 |
| CN | 104701523 A | 6/2015 |

(Continued)

OTHER PUBLICATIONS

EP Decision to grant a patent based on the Patentable Claims of its corresponding EP application No. 20859977.9 mailed Sep. 13, 2023.

(Continued)

*Primary Examiner* — Carlos Barcena
(74) *Attorney, Agent, or Firm* — LADAS & PARRY LLP

(57) ABSTRACT

This application discloses a positive electrode active material, including secondary particles and a coating layer applied on an exterior surface of each of the secondary particles, where the secondary particle includes a lithium transition metal oxide that contains a doping element $M^1$, the coating layer includes an oxide of element $M^2$, $M^1$ is selected from one or more of Si, Ti, Cr, Mo, V, Ge, Se, Zr, Nb, Ru, Rh, Pd, Sb, Te, Ce, and W, and $M^2$ is selected from one or more of Mg, Al, Ca, Ce, Ti, Zr, Zn, Y, and B; a relative deviation of local mass concentration of element $M^1$ in the secondary particle is less than 20%; and the secondary (Continued)

particle from the core to the exterior surface of the particle includes a plurality of layers of primary particles arranged along radial direction of the secondary particle.

20 Claims, 4 Drawing Sheets

(51) Int. Cl.
*H01M 4/505* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/028* (2013.01)

(56) References Cited

FOREIGN PATENT DOCUMENTS

| CN | 104953111 A | 9/2015 |
|---|---|---|
| CN | 106711414 A | 5/2017 |
| CN | 108054354 A | 5/2018 |
| CN | 108155357 A | 6/2018 |
| CN | 108336326 A | 7/2018 |
| CN | 108432003 A | 8/2018 |
| CN | 108878869 A | 11/2018 |
| CN | 100216651 A | 1/2019 |
| CN | 109273710 A | 1/2019 |
| CN | 109560276 A | 4/2019 |
| CN | 109716565 A | 5/2019 |
| CN | 110023246 A | 7/2019 |
| CN | 110265631 A | 9/2019 |
| EP | 3386009 A1 | 10/2018 |
| WO | 2018043653 A1 | 3/2018 |
| WO | 2018179916 A1 | 10/2018 |
| WO | 2018211951 A1 | 11/2018 |
| WO | 2019103488 A1 | 5/2019 |

OTHER PUBLICATIONS

ISR for International Application PCT /CN2020/112913 mailed Dec. 2, 2020.
Written Opinion for International Application PPCT /CN2020/112913 mailed Dec. 2, 2020.
Chinese Office Action for counterpart application 201910845574.1 mailed Jul. 30, 2021.
EESR dated Jan. 29, 2023 for Application No. EP 20859977.9.
Yike, et al., "Nb-doping in LINi0.8Co0.1 Mn0.102 cathode material: Effect on the cycling stability and voltage decay at high rates", Journal of the Taiwan Institute of Chemical Engineers, vol. 97 Feb. 8, 2019, pp. 255-263.
Cui, et al., "Preparation and characteristics of Sb-doped LiNiO2 cathode materials for Li-ion batteries", Journal of Physics and Chemistry of Solids, vol. 72, No. 7, Apr. 22, 2011, pp. 899-903.
Li, et al., "Effects of Nb substitution on structure and electrochemical properties of LiNi0.7Mn0.302 cathode materials", Journal of Solid State Electrochemistry, vol. 2, No. 9, May 23, 2018, pp. 2811-2820.
China Notification to Grant Patent Right for Application No. 201910845574.1, issued Feb. 14, 2022, 5 pages.
Yabuuchi, Naoaki et al., "Understanding Particle-Size-Dependent Electrochemical Properties of Li2MnO3-Based Positive Electrode Materials for Rechargeable Lithium Batteries," J. Phys. Chem. C 2016, 120, 2, 875-885, 11 pages.
Li, Wang et al., "Manufacturing method for cathode materials of Li-ion batteries," Energy Storage Science and Technology « 2018, vol. 7 » Issue (5): 888-896, 9 pages.

POSITIVE ELECTRODE ACTIVE MATERIAL AND PREPARATION METHOD THEREOF, POSITIVE ELECTRODE PLATE, LITHIUM-ION SECONDARY BATTERY, AND APPARATUS CONTAINING SUCH LITHIUM-ION SECONDARY BATTERY

This application is a continuation of International Patent Application No. PCT/CN2020/112913 filed on Sep. 1, 2020, which claims priority to Chinese Patent Application No. 201910845574.1 filed on Sep. 2, 2019 and entitled "POSITIVE ELECTRODE ACTIVE MATERIAL, POSITIVE ELECTRODE PLATE, AND LITHIUM-ION SECONDARY BATTERY", which is incorporated herein by reference in its entirety.

TECHNICAL FIELD

This application relates to the field of secondary battery technologies, and specifically to a positive electrode active material and a preparation method thereof, a positive electrode plate, a lithium-ion secondary battery, and an apparatus containing such lithium-ion secondary battery.

BACKGROUND

Lithium-ion secondary batteries are rechargeable batteries that operate mainly depending on migration of lithium ions between a positive electrode and a negative electrode, and are a clean energy source currently in wide use. As an important part of a lithium-ion secondary battery, a positive electrode active material provides the lithium ions that reciprocate between the positive and negative electrodes for battery charging and discharging, and therefore the positive electrode active material is crucial to performance of the battery.

As lithium-ion secondary batteries have been increasingly used in various electronic products, electric appliances, and electric vehicles, higher requirements are imposed on energy density of the batteries. Therefore, how to further improve the energy density of the lithium-ion secondary batteries has become a technical issue to be addressed urgently.

SUMMARY

The inventors have found that, a nickel-containing lithium transition metal oxide has a relatively high theoretical capacity. A lithium-ion secondary battery using a nickel-containing lithium transition metal oxide as a positive electrode active material may have a relatively high energy density, but research shows that such lithium ion secondary battery generally has relatively poor high-temperature cycling performance.

Extensive research has been made by the inventors, with an aim to improve traditional positive electrode active materials, so that the positive electrode active material can improve its own stability while having a higher specific capacity, thereby providing a lithium-ion secondary battery with relatively high energy density, good high-temperature storage performance, and good high-temperature cycling performance.

Therefore, a first aspect of this application provides a positive electrode active material, including secondary particles and a coating layer applied on an exterior surface of each of the secondary particles, where the secondary particle includes a lithium transition metal oxide, the coating layer includes an oxide of element $M^2$, and the positive electrode active material satisfies a chemical formula (1):

$$Li_{1+a}[Ni_xCo_yMn_zM^1_bM^2_c]O_{2-d}X_d \quad \text{chemical formula (1)}$$

In the chemical formula (1), $M^1$ is an element doped in a transition metal site of the lithium transition metal oxide, $M^1$ is selected from one or more of Si, Ti, Cr, Mo, V, Ge, Se, Zr, Nb, Ru, Rh, Pd, Sb, Te, Ce, and W, X is an element doped in an oxygen site of the lithium transition metal oxide, X is selected from one or more of F, Cl, Br, I, S, N, and P, $M^2$ is an element of the coating layer, $M^2$ is selected from one or more of Mg, Al, Ca, Ce, Ti, Zr, Zn, Y, and B, $0.5 \leq x < 1$, $0 < y \leq 0.3$, $0 \leq z \leq 0.3$, $-0.1 < a < 0.2$, $0 < b < 0.3$, $0 < c < 0.3$, $0 \leq d < 0.2$, $0 < b+c < 0.3$, and $x+y+z+b=1$.

A relative deviation of local mass concentration of element $M^1$ in the secondary particle is less than 20%.

A secondary particle from the core to the exterior surface of the particle includes a plurality of layers of primary particles arranged along radial direction of the secondary particle, and the number of primary particles contained in the outermost layer of the plurality of layers ranges from 5 per $\mu m^2$ to 50 per $\mu m^2$.

The positive electrode active material provided in this application includes a lithium transition metal oxide that contains nickel and cobalt, and element $M^1$ is uniformly doped in the lithium transition metal oxide, so that the positive electrode active material has a higher specific capacity, making lithium-ion secondary batteries using this positive electrode active material have higher energy density. The secondary particle of the positive electrode active material has appropriate size and distribution of primary particles, which can increase compacted density and capacity of the positive electrode active material, thereby further improving the specific capacity of the positive electrode active material, and also improving mechanical strength of the positive electrode active material. Uniformly doped element $M^1$ can further increase the compacted density, and improve overall structural stability of the positive electrode active material during high-temperature cycling and high-temperature storage, making it not prone to crack. In addition, the coating layer that contains the oxide of element $M^2$ can protect the secondary particles, so that the positive electrode active material is not corroded by the electrolyte, and side reactions of the electrolyte on a surface of the positive electrode active material are reduced. Therefore, using the positive electrode active material in this application can also significantly improve the high-temperature storage performance and high-temperature cycling performance of the battery.

In any of the foregoing embodiments, optionally, a deviation a of a concentration of element $M^1$ in the positive electrode active material with respect to an average mass concentration of element $M^1$ in the secondary particles satisfies $\varepsilon < 50\%$, optionally e is less than 30%; and optionally, $\varepsilon$ is less than 20%. The positive electrode active material may have higher capacity extractability and better high-temperature cycling performance.

In any of the foregoing embodiments, a specific surface area of the positive electrode active material ranges from 0.1 $m^2/g$ to 1.5 $m^2/g$, optionally from 0.2 $m^2/g$ to 1 $m^2/g$, and further optionally from 0.3 $m^2/g$ to 0.8 $m^2/g$. The positive electrode active material with a specific surface area within an appropriate range helps improve capacity performance and cycling performance of the battery.

In any of the foregoing embodiments, a compacted density of the positive electrode active material under a pressure of 5 tons (equivalent to 49 kN) may be more than 3.0 $g/cm^3$, and optionally, from 3.1 g/cm³ to 3.8 g/cm³. The positive electrode active material has a relatively high compacted density, which can help improve energy density of the battery.

In any of the foregoing embodiments, a volume median particle size $D_v50$ of the positive electrode active material ranges from 3 μm to 25 μm, optionally from 6 μm to 20 μm, and further optionally from 8 μm to 15 μm. The positive electrode active material with a $D_v50$ within an appropriate range can improve the cycling performance and rate performance of the battery, and can also improve the energy density of the battery.

In any of the foregoing embodiments, a length of the primary particle ranges from 100 nm to 1000 nm, and a width of the primary particle ranges from 50 nm to 400 nm. With this positive electrode active material, the energy density, high-temperature storage performance and high-temperature cycling performance of the battery can be further improved.

In any of the foregoing embodiments, an aspect ratio of the primary particle ranges from 2 to 20, optionally from 5 to 15, and further optionally from 8 to 12. The foregoing aspect ratio of the primary particle is suitable for the positive electrode active material to have better overall performance, thereby further improving energy density, high-temperature storage performance and high-temperature cycling performance of the battery.

In any of the foregoing embodiments, a concentration of element $M^1$ in the positive electrode active material ranges from 200 ppm to 8000 ppm, optionally from 200 ppm to 6000 ppm, further optionally from 1000 ppm to 5000 ppm; and a total concentration of element $M^1$ and element $M^2$ in the positive electrode active material ranges from 1000 ppm to 12000 ppm, optionally from 1000 ppm to 10000 ppm, and further optionally from 3000 ppm to 8000 ppm. The positive electrode active material with concentrations of element $M^1$ and element $M^2$ within the foregoing ranges can further improve high-temperature storage performance and high-temperature cycling performance of the battery, and also allow the battery to have a relatively high energy density.

In any of the foregoing embodiments, when the positive electrode active material is in a 78% delithiated state, element $M^1$ has a valence higher than +3, optionally one or more valences of +4, +5, +6, +7, and +8; or when the positive electrode active material is in a 78% delithiated state, element $M^1$ has more than two different valence states, and element $M^1$ in the highest valence state has one or more valences of +4, +5, +6, +7, and +8. The positive electrode active material satisfies the foregoing conditions, and can further improve the high-temperature storage performance and high-temperature cycling performance of the battery, and also further improve the energy density of the battery.

A second aspect of this application provides a preparation method of a positive electrode active material, including the following steps:
 (a) providing a mixture, where the mixture includes a precursor of a positive electrode active material, a lithium source, a precursor of element $M^1$, and optionally a precursor of element X;
 (b) subjecting the mixture to a sintering treatment to obtain secondary particles; and
 (c) mixing the secondary particles and a precursor of element $M^2$ and subjecting a resulting mixture to a sintering treatment, so as to obtain the positive electrode active material;
 where the positive electrode active material includes secondary particles and a coating layer applied on an exterior surface of each of the secondary particles, the secondary particle includes a lithium transition metal oxide, the coating layer includes an oxide of element $M^2$, and the positive electrode active material satisfies a chemical formula (1),

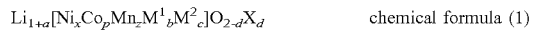

$$Li_{1+a}[Ni_xCo_pMn_zM^1_bM^2_c]O_{2-d}X_d \qquad \text{chemical formula (1)}$$

In the chemical formula (1). $M^1$ is an element doped in a transition metal site of the lithium transition metal oxide. $M^1$ is selected from one or more of Si, Ti, Cr, Mo, V, Ge, Se, Zr, Nb, Ru, Rh, Pd, Sb, Te, Ce, and W, X is an element doped in an oxygen site of the lithium transition metal oxide, X is selected from one or more of F, Cl, Br, I, S, N, and P, $M^2$ is an element of the coating layer, $M^2$ is selected from one or more of Mg, Al, Ca, Ce, Ti, Zr, Zn, Y, and B, 0.5≤x<1, 0<y≤0.3, 0≤z≤0.3, −0.1<a<0.2, 0<b<0.3, 0<c<0.3, 0≤d<0.2, 0<b+c<0.3, and x+y+z+b=1.

A relative deviation of local mass concentration of element $M^1$ in the secondary particle is less than 20%.

The secondary particle from the core to the exterior surface of the particle includes a plurality of layers of primary particles arranged along radial direction of the secondary particle, and the number of primary particles contained in the outermost layer of the plurality of layers ranges from 5 per μm² to 50 per μm².

The positive electrode active material obtained in the preparation method provided in this application includes secondary particles, where the secondary particles include a lithium transition metal oxide that contains nickel and cobalt, element $M^1$ is uniformly doped in the secondary particles, the secondary particle has appropriate size and distribution of primary particles, and an exterior surface of each of the secondary particles is coated with an oxide of element $M^2$. Therefore, using the positive electrode active material in this application allows the battery to have relatively high energy density, good high-temperature storage performance, and good high-temperature cycling performance.

In any of the foregoing embodiments, an atmosphere for the sintering treatment in step (b) is an atmosphere that contains oxygen; and optionally, a percentage of oxygen in the sintering atmosphere ranges from 80% to 100%.

In any of the foregoing embodiments, a temperature for the sintering treatment in step (b) ranges from 500° C. to 1000° C., optionally from 600° C. to 1000° C., and further optionally from 700° C. to 900° C.

In any of the foregoing embodiments, duration for the sintering treatment ranges from 5 hours to 35 hours, optionally from 5 hours to 25 hours, and further optionally from 10 hours to 20 hours.

In any of the foregoing embodiments, the precursor of element $M^1$ can be divided into L batches for doping, where L ranges from 1 to 5, and optionally from 2 to 3. The method may include: mixing the precursor of the positive electrode active material, the lithium source, and a first batch of precursor of element $M^1$, and performing a first sintering treatment; mixing a product of the first sintering treatment with a second batch of precursor of element $M^1$, performing a second sintering treatment, and so on, until a product of an $(L-1)^{th}$ sintering treatment is mixed with an $L^{th}$ batch of precursor of element $M_1$; and performing an $L^{th}$ sintering treatment to obtain the secondary particles.

In any of the foregoing embodiments, the precursor of element $M^1$ can be equally or randomly divided into L parts to perform doping in L batches; optionally, the precursor of element $M^1$ is divided into two batches for doping; and optionally, a mass ratio of the first batch of precursor of element $M^1$ to the second batch of precursor of element $M^1$ is a ratio of 4060 to 6040, and optionally a ratio of 4555 to 5545.

In any of the foregoing embodiments, a temperature for each sintering treatment ranges from 500° C. to 1000° C., optionally from 700° C. to 900° C., and further optionally from 800° C. to 850° C.; and duration for each sintering treatment ranges from 2 hours to 25 hours, and optionally from 5 hours to 20 hours.

In any of the foregoing embodiments, an atmosphere for the sintering treatment in step (c) is an atmosphere that contains oxygen; and optionally, a percentage of oxygen in the sintering atmosphere ranges from 80% to 100%.

In any of the foregoing embodiments, a temperature for the sintering treatment in step (c) ranges from 200° C. to 700° C., and optionally from 200° C. to 500° (C.

In any of the foregoing embodiments, duration for the sintering treatment in step (c) ranges from 2 hours to 10 hours, and optionally from 5 hours to 8 hours.

A third aspect of this application provides a positive electrode plate, including a positive electrode current collector and a positive electrode active substance layer disposed on the positive electrode current collector, where the positive electrode active substance layer includes the positive electrode active material according to the first aspect of this application, or the positive electrode active material obtained in the method according to the second aspect of this application.

The positive electrode plate in this application includes the positive electrode active material in this application, thereby making the lithium-ion secondary battery using the positive electrode plate have relatively high energy density, good high-temperature storage performance, and good high-temperature cycling performance.

A fourth aspect of this application provides a lithium-ion secondary battery, including the positive electrode plate according to the third aspect of this application.

The lithium-ion secondary battery in this application includes the positive electrode plate in this application, and therefore can have relatively high energy density, high-temperature storage performance and high-temperature cycling performance.

A fifth aspect of this application provides an apparatus, including the lithium-ion secondary battery according to the fourth aspect of this application. The lithium-ion battery may be used as a power source for the apparatus, or an energy storage unit of the apparatus. The apparatus may be, but is not limited to, an electronic product, an electric appliance, an electric vehicle, or the like.

The apparatus provided in this application includes the lithium-ion secondary battery in this application, and therefore may have the same or similar beneficial effects.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DESCRIPTION OF EMBODIMENTS

Figure 1:
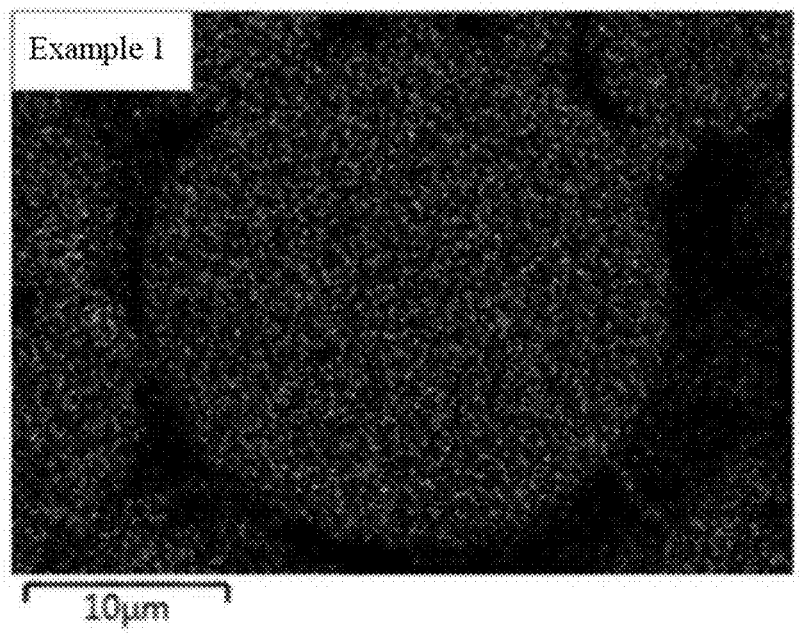
FIG. 1 is a doping element distribution diagram of a cross section of a positive electrode active material according to an embodiment of this application, where the cross section is obtained by using a cross section polisher (CP), and the doping element distribution diagram is obtained by using an energy dispersive spectroscopy (EDS), a highlighted spot therein represents a doping element, and the doping element is uniformly distributed in particles.

To make the objectives, technical solutions, and beneficial technical effects of this application clearer, this application is further described below in detail with reference to embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may be used as its own lower limit or upper limit to be combined with any other point or individual value or combined with any other lower limit or upper limit to form a range not expressly recorded.

In the description of this specification, it should be noted that, unless otherwise stated, "more than" and "less than" a number means inclusion of the number itself, and "more" in "one or more" means at least two.

In the description of this specification, unless otherwise specified, the term "or (or)" is inclusive. In other words, the phrase "A or (or) B" means "A, B, or both A and B". More specifically, all the following conditions fall within the condition "A or B": A is true (or present) and B is false (or not present); A is false (or not present) and B is true (or present); or both A and B are true (or present).

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative but should not be interpreted as exhaustive.

Positive Electrode Active Material

An embodiment of this application provides a positive electrode active material. The positive electrode active material includes secondary particles and a coating layer applied on an exterior surface of each of the secondary particles.

The secondary particle is formed by agglomeration of primary particles. The secondary particle from the core to the exterior surface of the particle includes a plurality of layers of primary particles, and the primary particles at each layer are arranged along radial direction of the secondary particle. The number of primary particles contained in the outermost layer of the plurality of layers ranges from 5 per $\mu m^2$ to 50 per $\mu m^2$.

The secondary particle includes a lithium transition metal oxide that contains a doping element $M^1$, and the coating layer includes an oxide of element $M^2$. The positive electrode active material satisfies the following formula (1):

$$Li_{1+a}[Ni_xCo_pMn_zM^1_bM^2_c]O_{2-d}X_d \quad \text{chemical formula (1)}$$

In the chemical formula (1), $0.5 \leq x < 1$, $0 < y \leq 0.3$, $0 \leq z \leq 0.3$, $-0.1 < a < 0.2$, $0 < b < 0.3$, $0 < c < 0.3$, $0 \leq d < 0.2$, $0 < b+c < 0.3$, and $x+y+z+b=1$.

$M^1$ is an element doped in a transition metal site of the lithium transition metal oxide, and $M^1$ is selected from one or more of Si, Ti, Cr, Mo, V, Ge, Se, Zr, Nb. Ru, Rh, Pd, Sb, Te, Ce, and W. The doping element $M^1$ is uniformly distributed in the secondary particle (as shown in FIG. 1). Specifically, a relative deviation of local mass concentration of element $M^1$ in the secondary particle is less than 20%.

X is an element doped in an oxygen site of the lithium transition metal oxide, and X is selected from one or more of F, Cl, Br, I, S, N, and P.

$M^2$ is an element of the coating layer, and $M^2$ is selected from one or more of Mg, Al, Ca, Ce, Ti, Zr, Zn, Y, and B.

In this specification, the coating layer on the exterior surface of the second particle is a slight coating layer, and contours of the primary particles on the exterior surface of each of the secondary particles can be distinguished in the measurement. The number of primary particles contained in the outermost layer of the secondary particle may be determined by the following method.

Figure 2:
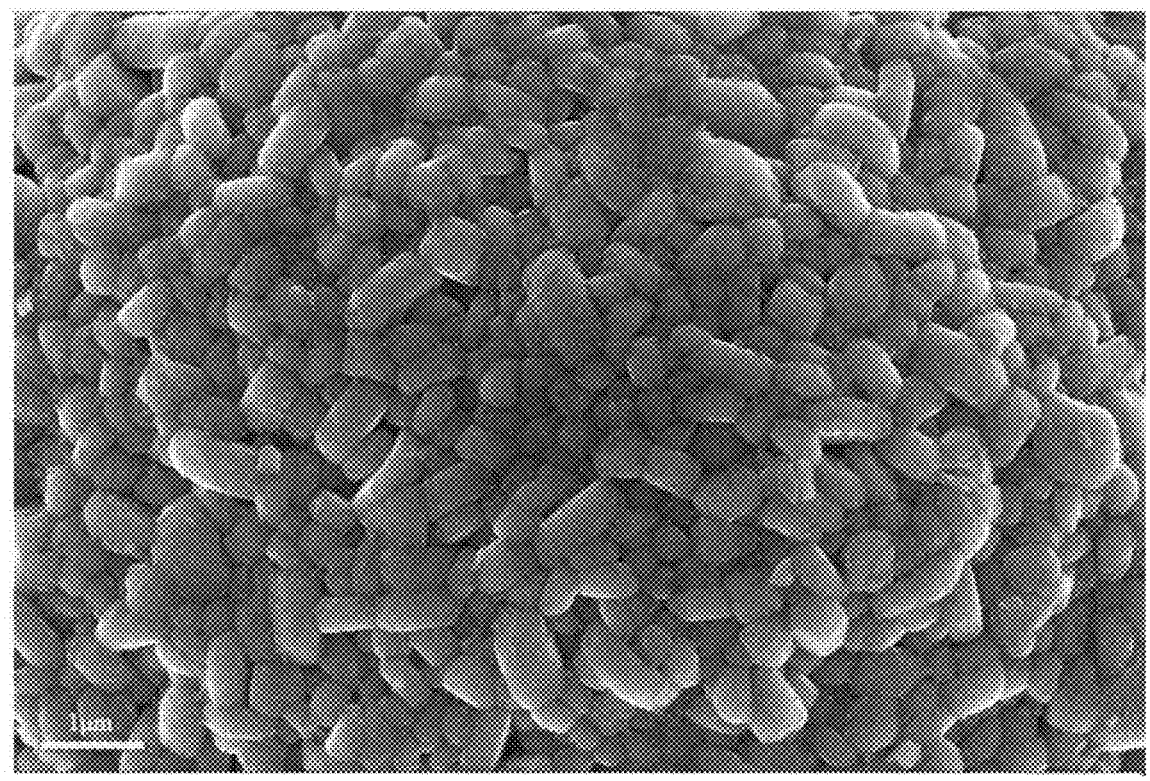
FIG. 2 is a SEM (Scanning Electron Microscope) image of a positive electrode active material according to an embodiment of this application.

The method includes: A sample of the positive electrode active material particles including secondary particles is taken, and then a SEM (Scanning Electron Microscope) inspection on the exterior surface of the sample is performed at a magnification of 10,000× to obtain a SEM image (as shown in FIG. 2), and primary particles can be seen throughout the SEM image; and then based on the SEM image, the number a of the primary particles (unit: particles per $\mu m^2$) in the outermost layer of the secondary particles is calculated according to the following equation (2):

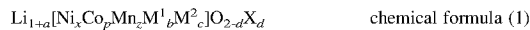

$$\kappa = \frac{\frac{(x_1+x_2)}{2} \times \frac{(y_1+y_2)}{2}}{\frac{\alpha}{\lambda} \times \frac{\beta}{\lambda}}. \quad (2)$$

In the equation (2), $x_1$ indicates the number of primary particles in a transverse direction on a lower edge of the 10,000×SEM image of the particles of the positive electrode active material; $x_2$ indicates the number of primary particles in a transverse direction on an upper edge of the 10,000× SEM image of the particles of the positive electrode active material; $y_1$ indicates the number of primary particles in a longitudinal direction on a left edge of the 10,000×SEM image of the particles of the positive electrode active material; $y_2$ indicates the number of primary particles in a longitudinal direction on a right edge of the 10,000×SEM image of the particles of the positive electrode active material; a indicates an actually measured horizontal length, in units of mm, of the 10,000×SEM image of the particles of the positive electrode active material; β indicates an actually measured longitudinal length, in units of mm, of the 10,000× SEM image of the particles of the positive electrode active material; and A indicates an actually measured length at a scale of 1 µm, in units of mm/µm, of the 10,000×SEM image of the particles of the positive electrode active material. During calculation of the number of primary particles in the 10,000× SEM image of the particles of the positive electrode active material, a primary particle with a portion present is counted as one primary particle.

The number of primary particles contained in the outermost layer of the secondary particle can reflect the size and distribution of the primary particles in the secondary particles. The inventors have found that, the size and distribution of the primary particles in the secondary particles directly affect transmission performance of lithium ions in the positive electrode active material, compacted density of the positive electrode active material, and other key indicators. In the positive electrode active material, the number of primary particles contained in the outermost layer of the secondary particle ranges from 5 per $\mu m^2$ to 50 per $\mu m^2$, optionally from 10 per $\mu m^2$ to 45 per $\mu m^2$, and for example, from 20 per $\mu m^2$ to 40 per $\mu m^2$, from 25 per $\mu m^2$ to 38 per $\mu m^2$, or from 30 per $\mu m^2$ to 40 per $\mu m^2$. Improved size and distribution of the primary particles in the secondary particle can improve the transmission performance of lithium ions in the particles of the positive electrode active material, thereby improving capacity extractability of the positive electrode active material. In addition, the positive electrode active material can also have a relatively high compacted density. Therefore, the specific capacity of the positive electrode active material can be further improved, thereby improving the energy density of the battery.

Appropriate size and distribution of the primary particles in the secondary particle can also obviously improve mechanical strength of the positive electrode active material, avoiding an occurrence of particle crushing during electrode plate rolling and during high-temperature charge-discharge cycle of the battery. In the battery using the positive electrode active material, side reactions caused by a large amount of fresh surfaces exposed by the crushing of the particles of the positive electrode active material are avoided, thereby reducing gas production of the battery during high-temperature storage and high-temperature cycling, and suppressing an increase of battery impedance. With this positive electrode active material, the high-temperature storage performance and high-temperature cycling performance of the battery can be improved.

In the positive electrode active material in this application, element $M^1$ is doped at transition metal sites of the lithium transition metal oxide, and the doping element $M^1$ is selected from one or more of Si, Ti, Cr, Mo, V, Ge, Se, Zr, Nb, Ru, Rh, Pd, Sb, Te, Ce, and W. The inventors have found that, an irreversible structural phase transition of the positive electrode active material from the layered phase to the spinel phase and then to the rock salt phase can be effectively inhibited by the doping of element $M^1$, thereby improving structural stability of the positive electrode active material during high-temperature storage and high-temperature cycling. In addition, bond energy between element $M^1$ and oxygen atoms is very large, which can effectively bind the oxygen atoms, making the positive electrode active material difficult to release oxygen during high-temperature storage and high-temperature cycling. This not only reduces the amount of gas generated by the positive electrode active material, but also reduces the amount of gas generated due to oxidative decomposition of the electrolyte caused by the release of oxygen, thereby effectively suppressing the battery flatulence caused by the positive electrode active material. Optionally, $M^1$ may be selected from one or more of Si, Ti, V, Nb, Ru, Sb, Te, and W. Further optionally, $M^1$ is selected from one or more of Ti, Nb, Ru, Sb, Te. and W.

Figure 3:
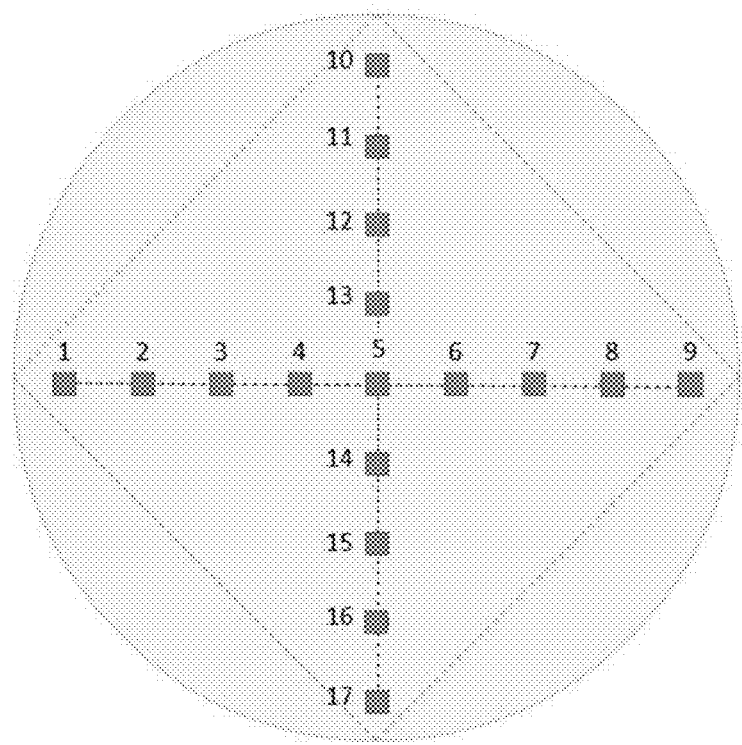
FIG. 3 is a schematic diagram of point sampling locations in relative deviation tests for local mass concentration of element $M^1$ in a secondary particle according to this application.

In this specification, the local mass concentration of element $M^1$ in the secondary particle is a mass concentration of element $M^1$ in all elements in a finite volume element at any selected site in the secondary particle, and may be obtained by testing the element concentration distribution through EDX (Energy Dispersive X-Ray Spectroscopy) or EDS element analysis in combination with TEM (Transmission Electron Microscope) or SEM (Scanning Electron Microscope) single-point scanning, or using other similar methods. When the test is performed through EDX or EDS element analysis in combination with TEM or SEM single-point scanning, the mass concentration of element $M^1$ in µg/g at different sites in the secondary particles are respectively denoted as $\eta_1, \eta_2, \eta_3, \ldots, \eta_n$, where n is a positive integer greater than or equal to 15 (as shown in FIG. 3).

An average mass concentration of element $M^1$ in the secondary particles is a mass concentration of element $M^1$ in all elements within a single secondary particle or multiple secondary particles, and may be obtained by testing element concentration distribution through EDX or EDS element analysis in combination with TEM or SEM plane scanning, or using other similar methods. When the test is performed in the manner of testing the element concentration distribution through EDX or EDS element analysis in combination with TEM or SEM plane scanning, the testing plane includes all test sites in the foregoing single-point testing (as shown in FIG. 3). The average mass concentration of element $M^1$ in the secondary particles is denoted as q in µg/g.

The relative deviation σ of local mass concentration of element $M^1$ in the secondary particle is calculated according to the following equation (3):

$$\sigma = \frac{\max\{|\eta_1 - \overline{\eta}|, |\eta_2 - \overline{\eta}|, |\eta_3 - \overline{\eta}|, \cdots, |\eta_n - \overline{\eta}|\}}{\overline{\eta}} \quad (3)$$

The positive electrode active material provided in this application includes a lithium transition metal oxide that contains nickel and cobalt, and the lithium transition metal oxide has a relatively high theoretical capacity, so that the battery with a relatively high energy density can be obtained. Also, element $M^1$ is uniformly doped in the lithium transition metal oxide. Element $M^1$ can have a large valence, and can contribute many electrons to the positive electrode active material, allowing the positive electrode active material to release more lithium ions in the charging process of the battery. Therefore, the specific capacity of the positive electrode active material is further improved, thereby further improving the energy density of the battery.

The inventors also have found that, when the relative deviation a of local mass concentration of element $M^1$ in the secondary particles is less than 20%, properties of internal portions of the secondary particles remain the same, structural stability throughout the particle can be effectively improved, and oxygen release throughout the particle is inhibited. Throughout interior of the secondary particles uniformly doped with element $M^1$, deformation resistance is consistent, so that the stress is distributed evenly throughout the interior of the particle, and an overall structure of the particle is stable, ensuring that the particles of the positive electrode active material with high compacted density are not prone to cracking, which can further reduce side reactions of the electrolyte caused by exposed fresh surfaces of the particles due to crack. In addition, migration and diffusion capabilities of lithium ions at different internal zones of the particle uniformly doped with element $M^1$ are at a same level, which is beneficial to improve capacity extractability of the positive electrode active material. Optionally, a is less than 17%, less than 15%, less than 12%, or less than 10%.

Uniform doping modification of the secondary particles by using the foregoing appropriate element $M^1$ makes the positive electrode active material have relatively high overall stability during high-temperature storage and high-temperature cycling, and have good lithium ion transmission performance. By using this positive electrode active material in this application, the battery has low gas production, low resistance, and good capacity extractability during high-temperature storage and high-temperature cycling, thereby further improving energy density, high-temperature storage performance and high-temperature cycling performance of the battery.

In addition, a coating layer is further applied on an exterior surface of each of the secondary particles, and the coating layer includes an oxide of element $M^2$. The coating layer can protect the secondary particles by blocking the contact between the secondary particles and the electrolyte to effectively protect the positive electrode active material from being corroded by the electrolyte, and can reduce side reactions on the surface of the positive electrode active material, to reduce the gas production of the battery Therefore, both the high-temperature cycling performance and high-temperature storage performance of the battery can be more effectively improved. Optionally, $M^2$ may be selected from one or more of Mg, Al, Ca, Ti, Zr, Y, and B. Optionally, $M^2$ is selected from one or more of Mg, Al, Ti, Zr, and Y.

The lithium-ion secondary batteries using this positive electrode active material in this application can have excellent overall performance. The batteries can have relatively high energy density, high-temperature storage performance and high-temperature cycling performance.

In some optional embodiments, a deviation E of a concentration of element $M^1$ in the positive electrode active material with respect to an average mass concentration $\overline{\eta}$ of element $M^1$ in the secondary particles satisfies ε<50%. Optionally, ε≤30%, optionally, ε≤20%, and optionally, ε≤15%.

A deviation of a concentration ω of element $M^1$ in the positive electrode active material with respect to the average mass concentration $\overline{\eta}$ of element $M^1$ in the secondary particles is calculated according to the following equation (4):

$$\varepsilon = \frac{|\omega - \overline{\eta}|}{\omega} \quad (4)$$

where ω is a mass concentration of element $M^1$ in ppm in the positive electrode active material, that is, the mass of element $M^1$ contained per gram of the positive electrode active material in µg. ω represents the concentration of element $M^1$ in overall macroscopic positive electrode active material, including element $M^1$ doped into the secondary particles, element $M^1$ enriched in other phases on surfaces of the secondary particles, and element $M^1$ embedded in the particles of the positive electrode active material. ω can be obtained through absorption spectrum tests of the positive electrode active material solution, for example, ICP (Inductive Coupled Plasma Emission Spectrometer) test or XAFS (X-ray absorption fine structure spectroscopy) test.

The positive electrode active material satisfying a within the foregoing ranges means that element $M^1$ is successfully doped in the secondary particles, and the concentration of the doping element distributed in other phases on the surface of the secondary particle and the concentration of element $M^1$ embedded in the gaps in the positive electrode active material are relatively low. The positive electrode active material has good macroscopic and microscopic consistency, uniform structure and high particle stability, helping the positive electrode active material achieve relatively high capacity extractability and high-temperature cycling performance.

In some embodiments, a concentration of element $M^1$ in the positive electrode active material ranges from 200 ppm to 8000 ppm, optionally from 200 ppm to 6000 ppm, further optionally from 1000 ppm to 5000 ppm, and further optionally from 2000 ppm to 4000 ppm.

In this specification, ppm (parts per million) is a ratio of mass of a specific element in the positive electrode active material to mass of the positive electrode active material.

An appropriate concentration of element $M^1$ in the positive electrode active material allows element $M^1$ to effectively improve the stability of the positive electrode active material and provide charge compensation for the positive electrode active material, and also allows the secondary particles to maintain a good layered structure, ensuring that the positive electrode active material provides a good carrier for deintercalation of lithium ions and preventing reversible lithium ions from being consumed on the electrode surface or in the electrolyte. With this positive electrode active material, irreversible capacity of the battery can be effectively reduced, so that the battery has a relatively high initial capacity and cycling capacity retention rate.

In some embodiments, a total concentration of element $M^1$ and element $M^2$ in the positive electrode active material may range from 1000 ppm to 12000 ppm, optionally from 1000 ppm to 10000 ppm, further optionally from 3000 ppm to 8000 ppm, and further optionally from 5000 ppm to 8000 ppm.

The positive electrode active material with concentrations of element $M^1$ and element $M^2$ within the foregoing ranges can better exert the foregoing effects of element $M^1$ and element $M^2$, and allow the battery to have a relatively high energy density.

In some optional embodiments, when the positive electrode active material is in a 78% delithiated state, element $M^1$ has a valence higher than +3, and optionally, one or more valences of +4, +5, +6, +7, and +8. Optionally, when the positive electrode active material is in a 78% delithiated state, element $M^1$ has one or more valences of +4, +5, and +6.

In this specification, the "78% delithiated state" means a state in which the number of moles of lithium released from the positive electrode active material is 78% of the total theoretical number of moles of lithium during charging of the battery. During actual use of the secondary battery, a "fully-charged state" and correspondingly, a "charge cut-off voltage" are set to ensure safe use of the battery. The "fully charged state" means that a state of charge (SOC) of the secondary battery is 100%, in other words, a secondary battery with a positive electrode including the positive electrode active material is charged to the charge cut-off voltage in the reversible charge and discharge processes. The "fully charged state" or "charge cut-off voltage" varies due to different positive electrode active materials or different security requirements. When the secondary battery prepared by using the positive electrode active material with a lithium transition metal oxide that contains nickel and cobalt is in a "fully charged state", the positive electrode active material generally is in the "78% delithiated state" to ensure normal use.

In this specification, with reference to a correspondence between a "delithiated state" and a charging voltage, the positive electrode active material in the "78% delithiated state" is obtained for research. Specifically, a series of batteries using the positive electrode active material are separately charged to 2.8 V, 2.9 V, 3.0 V, 3.1 V, 3.2 V, 3.3 V, . . . , 4.0 V, 4.1 V, 4.2 V, 4.3 V, 4.4 V 4.5 V 4.6 V 4.7 V (that is, a charging voltage step is 0.1 V) at a current rate of 0.1 C. Then the positive electrode plates of the batteries are removed, electrolytes are washed away from the positive electrode plates, and the positive electrode active material is digested. Mass concentrations of Li, transition metals, and element O in the positive electrode active materials are tested by using an inductively coupled plasma-optical emission spectrometer (ICP-OES), a stoichiometric ratio of elements in the positive electrode active material at the charging voltage is calculated, a chemical formula of the positive electrode active material at the charging voltage is obtained through conversion, and then a charge voltage corresponding to the "78% delithiated state" is obtained.

The battery including the positive electrode active material to be tested is charged to a voltage corresponding to the "78% delithiated state", and then is disassembled to obtain the positive electrode active material in the "78% delithiated state" for further research. The valence of element $M^1$ in the positive electrode active material in the "78% delithiated state" may be obtained through an X-ray photoelectron spectroscopy (XPS) analysis test. More precisely, the valence may be determined through synchrotron radiation photoelectron spectroscopy (SRPES) analysis.

The valence state of element $M^1$ in the positive electrode active material in the 78% delithiated state is relatively high, and in this state, element $M^1$ can better maintain oxygen atoms at their original lattice sites, prevent the positive electrode active material from releasing oxygen during heating and high-temperature cycling after dilithiation, and inhibit irreversible structural phase transition, thereby further improving structural stability and high-temperature cycling stability of the positive electrode active material. In addition, element $M^1$ can provide more electrons in the positive electrode active material, which can make the structure of the positive electrode active material more stable, reduce surface activity of the positive electrode active material, and reduce gas generation by electrolyte decomposition during high-temperature cycling and high-temperature storage. Therefore, both high-temperature cycling performance and high-temperature storage performance of the battery are improved. In addition, electrons contributed by element $M^1$ also allow the positive electrode active material to release more lithium ions, thereby further improving the energy density of the battery.

It may be understood that in the positive electrode active material before and after dilithiation, the valence state of element $M^1$ may remain unchanged, and element $M^2$ does not participate in the redox reaction during the battery charging. Element $M^1$ can stabilize the layered crystal structure of the positive electrode active material.

Element $M^1$ in the positive electrode active material may also participate in the redox reaction during the battery charging. Element $M^1$ has more than two stable valence states, and is in a lower valence state in the positive electrode active material before dilithiation. During battery charging, element $M^1$ contributes electrons to the positive electrode active material and its valence state increases. During battery charging, the electrons contributed by element $M^1$ cause charge compensation to take place inside the material, which can increase the number of lithium ions that can be released from the positive electrode active material, thereby improving the capacity performance and energy density of the battery. Moreover, element $M^1$ after the increase of valence state can strengthen the binding on oxygen atoms, improve the structural stability of the positive electrode active material, reduce the surface activity of the positive electrode active material, and improve high-temperature cycling performance and high-temperature storage performance of the battery.

In some embodiments, in the positive electrode active material in the "78% delithiated state", element $M^1$ may have more than two different valence states, and element $M^1$ in the highest valence state has one or more valences of +4, +5, +6, +7, and +8, and optionally, one or more valences of +4, +5, and +6. Element $M^1$ in a relatively high valence state and with a variable valence state can contribute more electrons to the positive electrode active material, which can further stabilize the material structure and reduce side reactions on the surface of the material, thereby further improving high-temperature cycling performance and high-temperature storage performance of the battery.

In addition, when the positive electrode active material is in the 78% delithiated state, element $M^1$ has more than two different valence states, and element $M^1$ in a lower valence state can further contribute electrons to allow the positive electrode to release more lithium ions, thereby further improving energy density of the battery.

A compacted density of the positive electrode active material in this application under a pressure of 5 tons (equivalent to 49 kN) is optionally more than 3.0 g/cm$^3$, for example, ranging from 3.1 g/cm$^3$ to 3.8 g/cm$^3$. The positive electrode active material has a relatively high compacted density, which can help improve energy density of the battery.

Size and distribution of the primary particles in the secondary particle also directly affect a specific area of the positive electrode active material, and other indicators. Appropriate size and distribution of the primary particles in the secondary particle in this application also help the positive electrode active material to have an appropriate specific surface area. The positive electrode active material with a specific surface area within an appropriate range can improve electrochemical performance of the positive electrode active material, improve capacity extractability of the battery, and help reduce side reactions of the electrolyte on the surface of the positive electrode active material to improve cycling life of the battery. In addition, an appropriate specific area of the positive electrode active material leaves particles not prone to agglomeration during slurry preparation, charging, and discharging, thereby helping improve capacity performance and cycling performance of the battery.

In some embodiments, the specific surface area of the positive electrode active material may range from 0.1 m$^2$/g to 1.5 m$^2$/g. Optionally, the specific surface area of the positive electrode active material ranges from 0.2 m$^2$/g to 1 m$^2$/g, and further optionally from 0.3 m$^2$/g to 0.8 m$^2$/g.

In some embodiments, optionally, a length of the primary particle ranges from 100 nm to 1000 nm, and a width of the primary particle ranges from 50 nm to 400 nm. In this specification, the length of the primary particle refers to a largest size of the primary particle. The extending direction of the largest size is defined as the longitudinal direction, and a width of the primary particle refers to a largest size in a direction perpendicular to the longitudinal direction.

When the primary particles in the secondary particle with a size are within the foregoing range, the positive electrode active material can have relatively high lithium ion transmission performance, a relatively high compacted density, an appropriate specific surface area, as well as a relatively high mechanical strength. With this positive electrode active material, the energy density, high-temperature storage performance and high-temperature cycling performance of the battery can be further improved.

In some embodiments, an aspect ratio of the primary particle in the secondary particle optionally ranges from 2 to 20, for example, from 5 to 15, and for another example, from 8 to 12. The aspect ratio of the primary particle refers to a ratio of the length to the width of the primary particle. The foregoing aspect ratio of the primary particle helps the particles of the positive electrode active material have better overall performance, thereby improving electrochemical performance of the battery.

In some embodiments, a volume median particle size $D_v50$ of the positive electrode active material may range from 3 μm to 25 μm, for example, from 6 μm to 20 μm, and for another example, from 8 μm to 15 μm.

The positive electrode active material with a $D_v50$ within the foregoing range improves transmission and diffusion performance of lithium ions and electrons in the positive electrode active material, and also helps reduce side reactions of the electrolyte on the surface of the positive electrode active material, thereby improving cycling performance and rate performance of the battery. In addition, the positive electrode active material with an appropriate $D_v50$ can also have a relatively high compacted density, thereby improving energy density of the battery.

In some embodiments, element X is optionally doped at the oxygen site of the lithium transition metal oxide, that is, in the chemical formula (1), 0<d<0.2. A predetermined amount of element X doped in the positive electrode active material can further improve structural stability of the positive electrode active material, and reduce side reactions on surfaces of the particles, thereby further improving high-temperature storage performance and high-temperature cycling performance of the battery. Optionally, X includes one or more of F, S, N and P. For example, X includes F.

In some optional embodiments, in the chemical formula (1), 0.6≤x<1, for example, 0.75 0.95. A lithium nickel cobalt manganese composite oxide with high nickel content has a higher gram capacity, allowing the battery to have a higher energy density.

In some embodiments, the secondary particle may be of a spherical or spheroidal shape.

In this specification, the $D_v50$ of the positive electrode active material has the meaning well known in the art, is also known as median particle size, and represents a particle size corresponding to 50% of volume distribution of particles in the positive electrode active material. The $D_v50$ of the positive electrode active material may be determined by using instruments and methods that are well known in the art, for example, may be easily determined by using a laser particle size analyzer, for example, a Mastersizer 3000 laser particle size analyzer from Malvern Instruments in UK.

The specific surface area of the positive electrode active material has the meaning well known in the art, and may be determined by using instruments and methods that are well known in the art, for example, may be determined by using the nitrogen adsorption specific surface area analysis test method and calculated by using the BET (Brunauer Emmett Teller) method. The nitrogen adsorption specific surface area analysis test may be carried out by using the NOVA 2000e specific surface area and pore size analyzer from Quantachrome company in USA. In a specific example, the test method is as follows: Approximately 8.000 g to 15.000 g of the positive electrode active material is placed into a weighed empty sample tube, the positive electrode active material is stirred well and weighed, the sample tube is put into the NOVA 2000e degassing station for degassing, total mass of the degassed positive electrode active material and the sample tube is weighed, and mass G of the degassed positive electrode active material is calculated by subtracting the mass of the empty sample tube from the total mass. The sample tube is put into the NOVA 2000e, adsorption amounts of nitrogen on the surface of the positive electrode active material at different relative pressures are determined, an adsorption amount of a monomolecular layer is calculated according to the Brunauer-Emmett-Teller multilayer adsorption theory and its equation, then a total surface area A of the positive electrode active material is calculated, and the specific surface area of the positive electrode active material is calculated by A/G.

The compacted density of the positive electrode active material has a well-known definition in the art, and may be determined by using an instrument and a method that are well known in the art, for example, may be conveniently determined by using an electronic pressure tester such as UTM7305.

Concentrations of elements $M^1$, $M^2$, and X in the positive electrode active material may be determined by using an instrument and a method that are well known in the art, for example, may be obtained through absorption spectrum tests of the positive electrode active material solution, such as ICP (Inductive Coupled Plasma Emission Spectrometer) test or XAFS (X-ray absorption fine structure spectroscopy) test.

Next, this application further provides a preparation method of a positive electrode active material. Any one of the foregoing positive electrode active materials can be prepared by the preparation method. It may be understood that obtaining the positive electrode active material in this application is not limited to the preparation method.

The preparation method includes:

S10. Providing a mixture, and subject the mixture to a sintering treatment to obtain secondary particles. The mixture includes a precursor of a positive electrode active material, a lithium source, and a precursor of element $M_1$.

S20. Mixing the secondary particles and a precursor of element $M^2$ and subject a resulting mixture to a sintering treatment, so as to obtain the positive electrode active material.

In step S10, the precursor of the positive electrode active material may be one or more of oxides, hydroxides, and carbonates that contain Ni, Co, and optionally Mn in a stoichiometric ratio, for example, hydroxides that contain Ni, Co, and Mn in a stoichiometric ratio.

The precursor of the positive electrode active material may be obtained in a method well-known in the art, for example, may be prepared in a co-precipitation method, a gel method, or a solid phase method.

During the preparation of the precursor of the positive electrode active material, many theoretically feasible ways may be used to control a structure of the precursor of the positive electrode active material, so as to improve the size and distribution of the primary particles in the secondary particles of the positive electrode active material. For example, in preparing the precursor of the positive electrode active material by the co-precipitation method, reaction raw materials selected for the preparation, a pH value of a reaction solution, a metal salt concentration, a concentration of a complexing agent, a reaction temperature, and a reaction time during preparation of the precursor of the positive electrode active material may be adjusted to control the structure of the precursor of the positive electrode active material.

In an example of preparing a precursor of the positive electrode active material by the co-precipitation method, a mixed solution is obtained by dispersing a Ni source, a Co source, and optionally an Mn source into a solvent; the mixed solution, a strong alkali solution, and a complexing agent solution are simultaneously pumped into a reactor with stirring function through continuous co-current reactions, where a pH value of the reaction solution is controlled to be 10 to 13, the temperature in the reactor ranges from 25° C. to 90° C., and inert gas is introduced for protection during the reaction; and after the reaction is completed, aging, filtering, washing, and vacuum drying are performed to obtain a hydroxide that contains Ni, Co, and optionally Mn.

The Ni source may be a soluble nickel salt, for example, one or more of nickel sulfate, nickel nitrate, nickel chloride, nickel oxalate, and nickel acetate, for another example, one or more of nickel sulfate and nickel nitrate, and for another example, nickel sulfate. The Co source may be a soluble cobalt salt, for example, one or more of cobalt sulfate, cobalt nitrate, cobalt chloride, cobalt oxalate, and cobalt acetate, for another example, one or more of cobalt sulfate and cobalt nitrate, and for another example, cobalt sulfate. The Mn source may be a soluble manganese salt, for example, one or more of manganese sulfate, manganese nitrate, manganese chloride, manganese oxalate, and manganese acetate, for another example, one or more of sulfuric acid manganese and manganese nitrate, and for another example, manganese sulfate.

The strong alkali may be one or more of LiOH, NaOH, and KOH, for example, NaOH.

The complexing agent may be one or more of ammonia, ammonium sulfate, ammonium nitrate, ammonium chloride, ammonium citrate, and disodium ethylenediaminetetraacetic acid (EDTA), for example, ammonia.

The solvents of the mixed solution, strong alkali solution, and complexing agent solution are not particularly limited. For example, the solvents of the mixed solution, strong alkali solution, and complexing agent solution each are one or more of deionized water, methanol, ethanol, acetone, isopropanol, and n-hexanol, for example, deionized water.

The inert gas introduced during the reaction is, for example, one or more of nitrogen, argon, and helium.

The lithium source may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$). Further, the lithium source is one or more of lithium carbonate, lithium hydroxide, and lithium nitrate; and furthermore, the lithium source is lithium carbonate.

The precursor of element $M^1$ may be one or more of an oxide, a nitric acid compound, a carbonic acid compound, a hydroxide compound, and an acetic acid compound of element $M^1$, for example, an oxide of element $M^1$. The oxide of element $M^1$ is, for example, one or more of silicon oxides (such as $SiO_2$ and $SiO$), titanium oxides (such as $TiO_2$ and $TiO$), chromium oxides (such as $CrO_3$ and $Cr_2O_3$), molybdenum oxides (such as $MoO_2$ and $MoO_3$), vanadium oxides (such as $V_2O_5$, $V_2O_4$, $V_2O_3$, and $VO$), germanium oxides (such as $GeO_2$), selenium oxides (such as $SeO_2$), zirconium oxides (such as $ZrO_2$), niobium oxides (such as $Nb_2O_5$ and $NbO_2$), ruthenium oxides (such as $RuO_2$), rhodium oxides (such as $Rh_2O_3$), palladium oxides (such as $PdO$), antimony oxides (such as $Sb_2O_5$ and $Sb_2O_3$), tellurium oxides (such as $TeO_2$), cerium oxides (such as $CeO_2$), and tungsten oxides (such as $WO_2$ and $WO_3$).

In step S10, the sintering may be performed in an atmosphere sintering furnace. The sintering atmosphere is an atmosphere that contains oxygen, for example, an air or oxygen atmosphere. An oxygen concentration in the sintering atmosphere optionally ranges from 80% to 100%. The sintering temperature may range from 500° C. to 1000° C., for example, from 600° C. to 1000° C. and for another example, from 700° C. to 900° C. This helps element $M^1$ have relatively high distribution uniformity. The sintering duration may be adjusted based on an actual situation, for example, ranging from 5 hours to 35 hours, for another example, ranging from 5 hours to 25 hours, and for another example, ranging from 10 hours to 20 hours.

It should be noted that during the preparation of the positive electrode active material, many theoretically feasible ways may be used to control distribution uniformity of doping element $M^1$ in the secondary particles, for example, by adjusting the sintering temperature, sintering duration, number of sintering times, type of doping elements, and doping concentration during the preparation of the positive electrode active material. In this application, some measures of a doping method for solid-phase sintering are listed. Through manners of adjusting the number of sintering times, doping the doping element in batches, controlling overall sintering duration and the sintering temperature, and the like, the positive electrode active material with element $M^1$ uniformly doped in the secondary particles is obtained. It should be understood that the methods described in this specification are merely intended to interpret this application, but not intended to limit this application.

In an example, the precursor of element $M^1$ may be divided into L batches for doping of the doping element, where L may range from 1 to 5, for example, from 2 to 3. In these embodiments, the preparation method of the positive electrode active material may include the following steps: mixing the precursor of the positive electrode active material, the lithium source, and a first batch of precursor of element $M^1$, and performing a first sintering treatment; mixing a product of the first sintering treatment with a second batch of precursor of element $M^1$, performing a second sintering treatment, and so on, until a product of an $(L-1)^{th}$ sintering treatment is mixed with an $L^{th}$ batch of precursor of element $M^1$; and performing an $L^{th}$ sintering treatment to obtain the secondary particles.

The precursor of element $M^1$ may be equally divided into L parts or randomly divided into L parts to perform doping in L batches. For example, in some embodiments, the precursor of element $M^1$ may be divided into two batches for doping. A mass ratio of the first batch of precursor of element $M^1$ to the second batch of precursor of element $M^1$ may be a ratio of 4060 to 6040, for example, a ratio of 45-55 to 5545.

Temperatures for sintering treatments may be the same or different. Sintering duration for the sintering treatments may be the same or different. A person skilled in the art may adjust the sintering temperature and duration according to the type and concentration of the doping element. For example, the temperature for each sintering treatment may range from 500° C. to 1000° C., for example, from 600° C. to 1000° C., for another example, from 700° C. to 900° C., and for another example, from 800° C. to 850° C.; the duration for each sintering treatment may range from 2 hours to 25 hours, for example, from 5 hours to 20 hours; and the total sintering duration may range from 5 hours to 35 hours, for example, from 5 hours to 25 hours, and for another example, from 10 hours to 20 hours.

For element $M^1$ for which doping is more difficult, such as element $M^1$ with a large atomic radius, the doping uniformity of element $M^1$ may be improved by increasing the sintering temperature and/or extending the sintering duration.

In some embodiments, in step S10, the mixture may also optionally include a precursor of element X. In this way, both doping elements $M^1$ and X may be contained in the secondary particles.

The precursor of element X may be added into the mixture all at one time, or be divided into more than two batches for doping of element X.

The precursor of element X may be, for example, selected from one or more of $NH_4F$, $NH_4Cl$, $NH_4Br$, $NH_4I$, $(NH_4)_2S$. $(NH_4)_3PO_4$, $(NH_4)_2HPO_4$, $NH_4H_2PO_4$, $LiF$, $LiCl$, $LiBr$, $LiI$, $Li_3N$, $Li_3P$, and $Li_2S$, but is not limited thereto.

In step S20, the precursor of element $M^2$ may be one or more of a chloride, a sulfate, a nitrate, an oxide, a hydroxide, a fluoride, a carbonate, a bicarbonate, an acetate, a phosphate, a dihydrogen phosphate, and an organic compound of element 12, but is not limited thereto.

In step S20, a mixed material of the secondary particles and the precursor of element $M^2$ may be placed into the atmosphere sintering furnace for sintering. The sintering atmosphere is an atmosphere that contains oxygen, for example, an air or oxygen atmosphere. An oxygen concentration in the sintering atmosphere optionally ranges from 80% to 100%.

The sintering temperature, for example, ranges from 200° C. to 700° C., for example, from 200° C. to 500° C., or from 300° C. to 400° C. The sintering duration may range from 2 hours to 10 hours, for example, from 5 hours to 8 hours. Due to the relatively low sintering temperature, oxides of element $M^2$ are hardly diffused into the interior of the secondary particles, but form a coating layer applied on an exterior surface of each of the secondary particles. The element $M^2$ has a high degree of lattice matching with the surface of the secondary particle, allowing the coating layer to be closely combined with the secondary particle without damaging the structure of the secondary particle, so that the coating layer reliably protects the secondary particle.

In some embodiments, before the secondary particles and the precursor of element $M^2$ are mixed, the secondary particles may be crushed and sieved to obtain the positive electrode active material with optimized particle size distribution and specific surface area. The crushing method is not particularly limited, and may be selected based on an actual need, for example, using a particle crusher.

During the preparation method of the positive electrode active material, a ball mill mixer or a high-speed mixer may be used to mix the materials. For example, materials are added to a high-speed mixer for mixing, and the mixing duration may range from 0.5 hours to 3 hours.

Positive Electrode Plate

This application further provides a positive electrode plate, where the positive electrode plate uses any one or more positive electrode active materials in this application.

Because the positive electrode plate uses the positive electrode active material in this application, the battery using the positive electrode plate can have relatively high energy density, high-temperature storage performance and high-temperature cycling performance.

Specifically, the positive electrode plate includes a positive electrode current collector and a positive electrode active substance layer disposed on at least one surface of the positive electrode current collector. For example, the positive electrode current collector includes two opposite surfaces in thickness direction of the positive electrode current collector, and the positive electrode active substance layer is provided on either or both of the two surfaces of the positive electrode current collector.

The positive electrode active substance layer includes any one or more positive electrode active materials in this application.

In addition, the positive electrode active substance layer may further include a conductive agent and a binder. Types of the conductive agent and the binder in the positive electrode active substance layer are not specifically limited in this application, and may be selected based on an actual need.

In an example, the conductive agent may be one or more of graphite, superconducting carbon, acetylene black, carbon black, Ketjen black, carbon dots, carbon nanotubes, graphene, and carbon nanofibers. The binder may be one or more of styrene-butadiene rubber (SBR), water-borne acrylic resin (water-based acrylic resin), carboxymethyl cellulose (CMC), polyvinylidene fluoride (PVDF), polytetrafluoroethylene (PTFE), polyvinyl butyral (PVB), ethylene vinyl acetate (EVA), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, fluorine-containing acrylic resin, and polyvinyl alcohol (PVA).

The positive electrode current collector may use a metal foil material or a porous metal plate with good electrical conductivity and mechanical properties, and a material of the positive electrode current collector may be one or more of aluminum, copper, nickel, titanium, silver, and their respective alloys. The positive electrode current collector is, for example, aluminum foil.

The positive electrode plate may be prepared by using a conventional method in the art. For example, the positive electrode active material, the conductive agent, and the binder are dispersed in a solvent which may be N-methylpyrrolidone (NMP) or deionized water, to obtain a uniform positive electrode slurry. The positive electrode slurry is applied on the positive electrode current collector, and the positive electrode plate is obtained after processes such as drying and roll-in are performed.

Lithium-Ion Secondary Battery

This application further provides a lithium-ion secondary battery, where the lithium-ion battery includes a positive electrode plate, a negative electrode plate, a separator, and an electrolyte, and the positive electrode plate is any positive electrode plate in this application.

The lithium-ion secondary battery in this application uses the positive electrode plate in this application, and therefore can have relatively high energy density, high-temperature storage performance and high-temperature cycling performance.

The negative electrode plate may be a metal lithium sheet.

The negative electrode plate may include a negative electrode current collector and a negative electrode active substance layer disposed on at least one surface of the negative electrode current collector. For example, the negative electrode current collector includes two opposite surfaces in thickness direction of the negative electrode current collector, and the negative electrode active substance layer is provided on either or both of the two surfaces of the negative electrode current collector.

The negative electrode active substance layer includes a negative electrode active material. Types of the negative electrode active material is not specifically limited in this application, and may be selected based on an actual requirement. In an example, the negative electrode active material may be one or more of natural graphite, artificial graphite, mesocarbon microbeads (MCMB), hard carbon, soft carbon, silicon, a silicon-carbon composite, $SiO_m$ (0<m<2, for example, m=1), a Li—Sn alloy, a Li—Sn—O alloy, Sn, SnO, $SnO_2$, lithium titanate $Li_4Ti_5O_{12}$ with a spinel-structure, an Li—Al alloy, and a lithium metal.

The negative electrode active substance layer may further include a conductive agent and a binder. Types of the conductive agent and binder in the negative electrode active substance layer are not specifically limited in the embodiments of this application, and may be selected based on an actual need. In an example, the conductive agent is one or more of graphite, superconducting carbon, acetylene black, carbon black, Ketjen black, carbon dots, carbon nanotube, graphene, and carbon nanofiber; and the binder is one or more of styrene butadiene rubber (SBR), polyvinylidene fluoride (PVDF), polytetrafluoroethylene (PTFE), polyvinyl butyral (PVB), water-based acrylic resin (water-based acrylic resin), and sodium carboxymethyl cellulose (CMC-Na).

The negative electrode active substance layer further optionally includes a thickener, for example, sodium carboxymethyl cellulose (CMC-Na).

The negative electrode current collector may use a metal foil material or a porous metal plate with good electrical conductivity and mechanical properties, and a material of the negative electrode current collector may be one or more of copper, nickel, titanium, iron, and their respective alloys. The negative electrode current collector is, for example, copper foil.

The negative electrode plate may be prepared by using a conventional method in the art. For example, the negative electrode active substance, the conductive agent, the binder, and the thickener are dispersed in a solvent which may be N-methylpyrrolidone (NMP) or deionized water, to obtain a uniform negative electrode slurry. The negative electrode slurry is applied on the negative electrode current collector, and the negative electrode plate is obtained after processes such as drying and roll-in are performed.

In the lithium-ion secondary battery of the embodiments of this application, the electrolyte may be a solid electrolyte, such as a polymer electrolyte or an inorganic solid electrolyte, but is not limited thereto. Alternatively, the electrolyte may be a liquid electrolyte that includes a solvent and a lithium salt dissolved in the solvent.

The solvent may be a non-aqueous organic solvent, for example, one or more, for example, more than two, of ethylene carbonate (EC), propylene carbonate (PC), ethyl methyl carbonate (EMC), diethyl carbonate (DEC), dimethyl carbonate (DMC), dipropyl carbonate (DPC), methyl propyl acetate (MPC), ethylene propyl carbonate (EPC), methyl fonnate (MF), methyl acetate (MA), ethyl acetate (EA), propyl acetate (PA), methyl propionate (MP), Ethyl propionate (EP), propyl propionate (PP), methyl butyrate (MB), and ethyl butyrate (EB).

The lithium salt may be one or more of $LiPF_6$ (lithium hexafluorophosphate), $LiBF_4$ (lithium tetrafluoroborate), $LiClO_4$ (lithium perchlomte), $LiAsF_6$ (lithium hexafluoroarsenate), iFSI (lithium bisfluorosulfonimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorophosphate), and LiTFOP (lithium tetrafluoro oxalate phosphate), for example, one or more of $UPF_6$ (lithium hexafluorophosphate), $liBF_4$ (lithium tetrafluoroborate), LiBOB (lithium bisoxalate), LiDFOB (lithium difluorooxalate), LiTFSI (lithium bistrifluoromethanesulfonimide), and UFSI (lithium bisfluorosulfonimide).

The liquid electrolyte further optionally includes another additive, such as one or more of vinylene carbonate (VC), vinyl ethylene carbonate (VEC), fluoroethylene carbonate (FEC), difluoroethylene carbonate (DFEC), trifluoromethyl ethylene carbonate (TFPC), succinonitrile (SN), adiponitrile (ADN), glutaronitrile (GLN), hexanetricarbonitrile (HTN), 1,3-propane sultone (1,3-PS), ethylene sulfate (DTD), methylene methane disulfonate (MMDS), 1-propene-1,3-sultone (PST), 4-methyl ethylene sulfate (PCS), 4-ethyl ethylene sulfate (PES), 4-propyl ethylene sulfate (PEGLST), propylene sulfate (TS), 1,4-butane sultone (1,4-BS), dioxathiolane 2-oxide (DTO), dimethyl sulfite (DMS), diethyl sulfite (DES), sulfonate cyclic quatemary ammonium salt, tris (trimethylsilane) phosphate (TMSP), and tris(trimethylsilane) borate (TMSB), but is not limited thereto.

The lithium-ion secondary battery in the embodiments of this application imposes no particular limitation on the separator, and any well-known porous separator with electrochemical stability and mechanical stability may be selected, for example, a mono-layer or multi-layer membrane of one or more of glass fiber, nonwoven fabric, polyethylene (PE), polypropylene (PP), and polyvinylidene fluoride (PVDF).

The positive electrode plate and the negative electrode plate are stacked alternately with a separator provided between the positive electrode plate and the negative electrode plate for separation, to obtain a cell, or a cell may be obtained after the stack is wound. The cell is placed into an outer package, a liquid electrolyte is injected, and the package is then sealed, to obtain a lithium-ion secondary battery.

Figure 4:
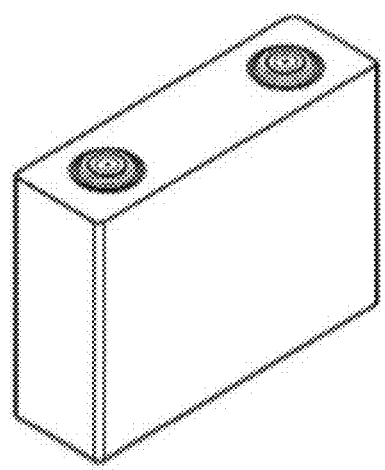
FIG. 4 is a schematic diagram of an embodiment of a lithium-ion secondary battery.

The shape of the lithium-ion secondary battery is not particularly limited in this application, which may be of a cylindrical shape, a square shape, or any other shape. FIG. 4 shows a lithium-ion secondary battery 5 of a square structure as an example.

In some embodiments, the lithium-ion secondary battery may include an outer package. The outer package is used for packaging the positive electrode plate, the negative electrode plate, and the electrolyte.

Figure 5:
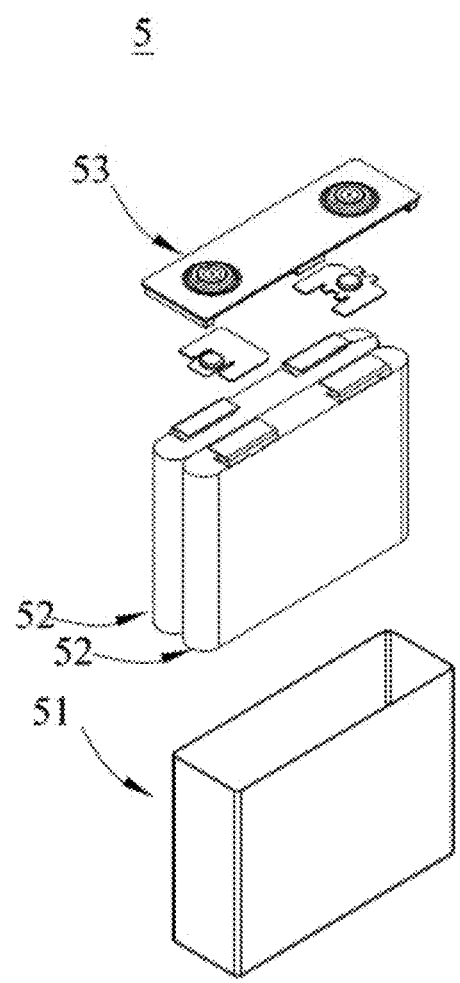
FIG. 5 is an exploded view of FIG. 4.

In some embodiments, with reference to FIG. 5, the outer package may include a housing 51 and a cover plate 53. The housing 51 may include a bottom plate and side plates connected to the bottom plate, and the bottom plate and the side plates enclose an accommodating cavity. The housing 51 has an opening communicating with the accommodating cavity, and the cover plate 53 can cover the opening to close the accommodating cavity.

The positive electrode plate, the negative electrode plate, and the separator may be wound or laminated to form a cell 52. The cell 52 is packaged in the accommodating cavity. The electrolyte may be a liquid electrolyte infiltrating the cell 52. There may be one or more cells 52 in the lithium-ion secondary battery 5, and their quantity may be adjusted as required.

In some embodiments, the outer package of the lithium-ion secondary battery may be a hard shell, such as a hard-plastic shell, an aluminum shell, or a steel shell. The outer package of the lithium-ion secondary battery also may be a soft package, for example, a soft bag. A material of the soft package may be plastic, for example, may include one or more of polypropylene (PP), polybutylene terephthalate (PBT), polybutylene succinate (PBS), and the like.

In some embodiments, lithium-ion secondary batteries may be assembled into a battery module, and the battery module may include a plurality of lithium-ion secondary batteries. The specific quantity may be adjusted based on application and capacity of the battery module.

Figure 6:
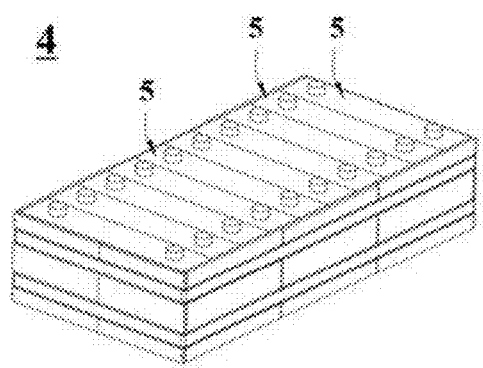
FIG. 6 is a schematic diagram of an embodiment of a battery module.

FIG. 6 shows a battery module 4 used as an example. With reference to HG 6, in the battery module 4, a plurality of lithium-ion secondary batteries 5 may be sequentially arranged in a length direction of the battery module 4. Certainly, the plurality of lithium-ion secondary batteries may be arranged in any other manner. Further, the plurality of lithium-ion secondary batteries 5 may be fixed by using fasteners.

Optionally, the battery module 4 may further include an enclosure with an accommodating space, and the plurality of lithium-ion secondary batteries 5 are accommodated in the accommodating space.

In some embodiments, battery modules may be further assembled into a battery pack, and a quantity of battery modules included in the battery pack may be adjusted based on application and capacity of the battery pack.

Figure 7:
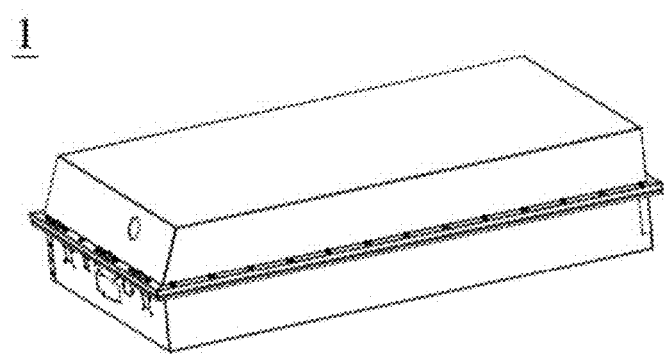
FIG. 7 is a schematic diagram of an embodiment of a battery pack.
Figure 8:
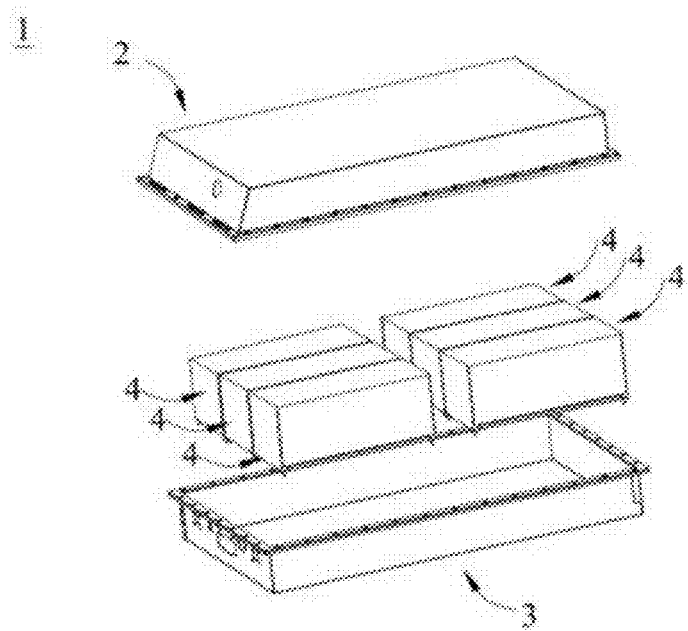
FIG. 8 is an exploded view of FIG. 7.

FIG. 7 and FIG. 8 show a battery pack 1 used as an example. With reference to HG 7 and HG 8, the battery pack 1 may include a battery box and a plurality of battery modules 4 disposed in the battery box. The battery box includes an upper box body 2 and a lower box body 3. The upper box body 2 can cover the lower box body 3 to form an enclosed space for accommodating the battery modules 4. The plurality of battery modules 4 may be arranged in the battery box in any manner.

This application further provides an apparatus, including any of the lithium-ion secondary batteries in this application. The lithium-ion secondary battery may be used as a power source for the apparatus, or an energy storage unit of the apparatus. The apparatus may be, but is not limited to, an electronic product, an electric vehicle, an electric train, a ship, a satellite, an electric appliance, an energy storage system, or the like. The electronic product may be, but is not limited to, a mobile device (for example, a mobile phone, a tablet computer, or a notebook computer). The electric vehicle may be, but is not limited to, a battery electric vehicle, a hybrid electric vehicle, a plug-in hybrid electric vehicle, an electric bicycle, an electric scooter, an electric golf vehicle, an electric truck, or the like.

A lithium-ion secondary battery or a battery module or battery pack that is assembled by lithium-ion secondary batteries may be selected for the apparatus according to requirements for using the apparatus.

Figure 9:
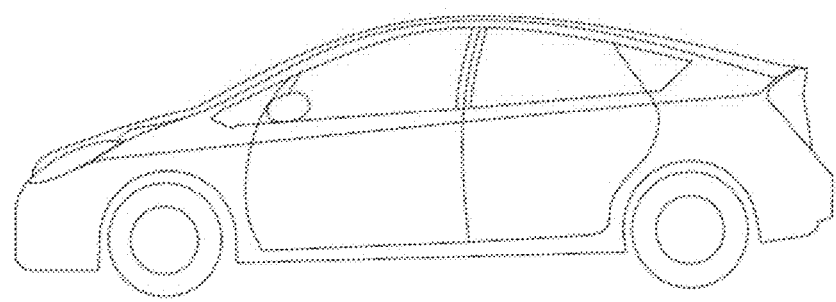
FIG. 9 is a schematic diagram of an embodiment of an electric vehicle using a lithium-ion secondary battery as a power source.

FIG. 9 shows an electric vehicle used as an example. The electric vehicle is a battery electric vehicle, a hybrid electric vehicle, a plug-in hybrid electric vehicle, or the like. To meet a requirement of the apparatus for high power and high energy density of the lithium-ion secondary battery, a battery pack or battery module may be used.

EXAMPLES

Content disclosed in this application is described in detail in the following examples. These examples are intended only for illustrative purposes because various modifications and changes made without departing from the scope of the content disclosed in this application are apparent to those skilled in the art. Unless otherwise stated, all parts, percentages, and ratios reported in the following examples are based on weights, all reagents used in the examples are commercially available or synthesized in a conventional manner, and can be used directly without further processing, and all instruments used in the examples are commercially available.

Example 1

Preparation of a Positive Electrode Active Material

1. Preparation of a precursor of a positive electrode active material: A precursor $[Ni_{0.8}Co_{0.1}Mn_{0.1}](OH)_2$ of the positive electrode active material was prepared by using the foregoing co-precipitation method. The precursor of the positive electrode active material included secondary particles formed by agglomeration of primary particles. The secondary particle from the core to the exterior surface of the particle included a plurality of layers of primary particles arranged along radial direction of the secondary particle. An median particle size $D_v50$ of the positive electrode active material was 13 μm. For the primary particle in the precursor of the positive electrode active material, its length ranged from 200 nm to 800 nm, its width ranged from 50 nm to 400 nm, and its aspect ratio ranged from 2 to 10.

2. Preparation of secondary particles: A doping element was Sb, and a precursor antimony oxide $Sb_2O_3$ of the doping element was roughly equally divided into two batches for doping.

The method included: A precursor of the positive electrode active material, lithium hydroxide LiOH, and the first batch of antimony oxide $Sb_2O_3$ were added to a high-speed mixer for mixing for 1 hour, to obtain a mixture, where a molar ratio Li/Me of the precursor of the positive electrode active material to lithium hydroxide was 1.05, and Me represented a total number of moles of Ni, Co, and Mn in the precursor of the positive electrode active material. The mixture was placed into an atmosphere sintering furnace for the first sintering, where a sintering temperature was 820° C., a sintering atmosphere was an oxygen-containing atmosphere with an $O_2$ concentration of 90%, and sintering duration was 10 hours.

A product of the first sintering treatment and the second batch of antimony oxides were added to the high-speed mixer for mixing for 1 hour, and then the second sintering was performed, with a sintering atmosphere same as that of the first sintering, a sintering temperature of 820° C., and sintering duration of 6 hours. Then the total sintering duration was 16 hours.

A product of the second sintering treatment was crushed and sieved to obtain the secondary particles.

3. Preparation of a coating layer: The secondary particles and aluminum oxide $Al_2O_3$ were added into the high-speed mixer for mixing for 1 hour. The mixed materials were placed into the atmosphere sintering furnace for sintering at 345° C., where the sintering atmosphere was an atmosphere that contains oxygen with an $O_2$ concentration of 90%, and the sintering duration was 7 hours, so that an $Al_2O_3$ coating layer was formed on the exterior surface of each of the secondary particles. Then a high-nickel ternary positive electrode active material was obtained.

An added amount of antimony oxide made a concentration of Sb in the positive electrode active material 3500 ppm, an added amount of $Al_2O_3$ made a concentration of Al in the coating layer 3000 ppm, and the concentration refers to a concentration in the positive electrode active material. The doping element Sb was uniformly doped in the bulk phase structure of the secondary particles.

Preparation of an Electrolyte

EC, DEC, and DMC were mixed at a volume ratio of 1:1:1 to obtain a solvent, and a lithium salt $LiPF_6$ was dissolved in the solvent to obtain an electrolyte, where a concentration of $LiPF_6$ was 1 mol/L.

Preparation of a Button Battery

The prepared positive electrode active material, conductive carbon black and a binder PVDF were dispersed into a solvent N-methylpyrrolidone (NMP) at a mass ratio of 90:5:5 and mixed well to obtain a positive electrode slurry. The positive electrode slurry was uniformly applied on the positive electrode current collector aluminum foil, and a positive electrode plate was obtained after processes such as drying and cold pressing were performed.

In a button box, the positive electrode plate, the separator, and metal lithium sheet were stacked in sequence, the foregoing electrolyte was injected, and a button battery was obtained through assembly.

Preparation of a Full Battery

The prepared positive electrode active material, a conductive agent acetylene black, and a binder PVDF were dispersed into a solvent NMP at a mass ratio of 94:3:3 and mixed well to obtain a positive electrode slurry. The positive electrode slurry was uniformly applied on the positive electrode current collector aluminum foil, and a positive electrode plate was obtained after processes such as drying and cold pressing were performed.

A negative electrode active material artificial graphite, hard carbon, a conductive agent acetylene black, a binder styrene butadiene rubber (SBR), and a thickener sodium carboxymethyl cellulose (CMC) were dispersed in deionized water at a mass ratio of 90:5:2:2:1, and were mixed well, to obtain a negative electrode slurry. The negative electrode slurry was uniformly applied on the negative electrode current collector aluminum foil, and a negative electrode plate was obtained after processes such as drying and cold pressing were performed.

A polyethylene (PE) porous polymer film was used as a separator. The positive electrode plate, the separator, and the negative electrode plate were stacked in sequence, to obtain a bare cell. The bare cell was placed in an outer package, the foregoing electrolyte was injected, and the package was sealed. After processes such as formation were performed, a full battery was obtained.

Examples 2 to 36 and Comparative Examples 1 to 10

A difference from Example 1 was that related parameters in the preparation steps 1 to 3 of the positive electrode active material were changed to obtain different positive electrode active materials, including adjusting the type of the doping element when being mixed, the proportion in each batch, the sintering temperature, the sintering duration, and the like. For details, refer to Table 1-1 and Table 1-2.

The precursor of the positive electrode active materials in Examples 2 to 34 and Comparative Examples 1 to 7 was [$Ni_{0.8}Co_{0.1}Mn_{0.1}$](OH) and the precursor of the positive electrode active materials in Examples 35 to 36 and Comparative Examples 8 to 10 was [$Ni_{0.5}Co_{0.2}Mn_{0.3}$](OH)$_2$.

The precursor of element $M^1$ in Examples 2 and 30 to 32 was $TeO_2$; the precursor of element $M^1$ in Examples 3, 33, and 34 was $WO_2$; the precursor of element $M^1$ in Examples 4, and 21 to 25 was $NbO_2$; the precursor of element $M^1$ in Examples 6, 19 and Comparative Example 6 was $TiO_2$; the precursor of element $M^1$ in Examples 17, 18, and 36, and Comparative Example 7 was $RuO_2$; the precursor of element $M^1$ in Example 20 and Comparative Example 5 was VO; the precursor of element $M^1$ in Examples 28 and 29 was $SiO_2$; the precursors of element $M^1$ in Example 7 were $Sb_2O_3$ and $WO_2$, and the two precursors had basically the same amount; and the precursor of element $M^1$ in Comparative Examples 3, 4 and 10 was $Al_2O_3$.

The other precursors of the coating element $M^2$ that were different from those in Example 1 were selected from $Y_2O_3$, $ZrO_2$, $TiO_2$, MgO, $B_2O_3$, and CaO; and the two precursors of $M^2$ in Example 8 had basically the same amount.

In Table 1-1 and Table 1-2:
Both Concentration of $M^1$ and Total concentration of $M^1$ and $M^2$ show concentrations in the positive electrode active material;
σ shows a relative deviation of local mass concentration of element $M_1$ in the secondary particle;
$D_v50$ shows a volume median particle size of the positive electrode active material;
Specific surface area shows a specific surface area of the positive electrode active material:
Compacted density shows a compacted density of the positive electrode active material under a pressure of 5 tons (equivalent to 49 kN);
κ shows the number of primary particles contained in the outermost layer of the secondary particle; and
Mass ratio=mass of first batch of precursor of element $M^1$:mass of second batch of precursor of element $M^1$.

Test
(1) Test of Relative Deviation of Local Mass Concentration of Element $M^1$ in the Secondary Particles 2 g of the positive electrode active material powder sample was weighed and taken, evenly sprinkled on the sample stage pasted with conductive adhesive, and then lightly pressed so that the powder is fixed. Alternatively, a 1 cm×1 cm electrode plate was cut out from the battery positive electrode plate and pasted on the sample stage as a sample to be tested. The sample stage was loaded into a vacuum sample chamber and fixed. An IB-09010CP cross section polisher from Japan Electron Optics Laboratory (JEOL) in Japan was used to prepare a cross section of the secondary particles. Points were taken with reference to 17 sites of the cross section of the secondary particle shown in FIG. 3, and an area of each site was 20 nm×20 nm. The X-Max energy dispersive spectrometer (EDS) from Oxford Instruments Group in UK was used together with a Sigma-02-33 scanning electron microscope (SEM) from ZEISS in German to test the mass concentrations of the doping element at the 17 sites. A test method was as follows: Li, O, Ni, Co, Mn, and the doping elements were selected as the to-be-tested elements; SEM parameters of a 20 kV acceleration voltage, a 60 μm diaphragm, an 8.5 mm working distance, and a 2.335 A current were set, and during the EDS test, when a spectrum area was more than 250000 cts (controlled by acquisition time and an acquisition rate), the test stopped, data was collected, and the mass concentrations of the doping elements at the sites were obtained and denoted respectively as $\eta_1, \eta_2, \eta_3, \ldots, \eta_{17}$.

A method for determining an average mass concentration $\bar{\eta}$ of the doping element in the secondary particles was as follows: The foregoing EDS-SEM measurement method was used, and as shown in a dashed box in FIG. 3, a test area covered all the scanned points of the foregoing secondary particle, and did not exceed the cross-section of the secondary particle.

A relative deviation v of local mass concentration of element $M^1$ in the secondary particles was calculated according to the preceding equation (3).

To test the positive electrode active material in the battery, the battery could be disassembled in a drying room, a middle portion of the positive electrode plate was removed and placed into a beaker, and an appropriate amount of high-purity anhydrous dimethyl carbonate (DMC) was added into the beaker. The DMC was renewed every 8 hours, and the positive electrode plate was consecutively cleaned for 3 times, then placed into a vacuum standing box in the drying room, and dried for 12 hours in a vacuum state (−0.096 MPa). An electrode plate sample with a size of 1 cm×1 cm or above was cut off from the dried positive electrode plate, and the electrode plate sample was stuck on a sample stage pasted with a conductive adhesive. Alternatively, 2 g of powder of the positive electrode active material was scrapped with a blade in the drying room as a test sample. The test was performed in the foregoing method.

(2) Test of the Number of Primary Particles Contained in the Outermost Layer of a Secondary Particle A sample of particles of the positive electrode active material was taken, and then a Sigma-02-33 SEM from ZEISS in Germany was used to perform a SEM inspection on the exterior surface of the sample at a magnification of 10,000× to obtain a SEM image; and then based on the SEM image, the number x of the primary particles per 1 μm×1 μm unit area in the outermost layer of the secondary particles was calculated according to the foregoing equation (2), in units of particles per μm².

(3) Test of Concentrations of Element $M^r$ and Element $M^2$ in the Positive Electrode Active Material Approximately 5 g of powder of the positive electrode active material was weighed, and placed into a digestion tank; or a full battery was discharged to 2.80 V at 0.33 C, and the battery cell was cut open with a pair of scissors to take out an entire middle part of a positive electrode plate; the middle part was put into a beaker, an appropriate amount of highly pure anhydrous dimethyl carbonate (DMC) was added, and the DMC was renewed every 8 hours; the positive electrode plate was consecutively cleaned for 3 times, then placed into a vacuum standing box in the drying room, and dried for 12 hours in a vacuum state (−0.096 MPa); and powder was scrapped from the dried positive electrode plate in the drying room with a blade, and approximately 5 g of powder of the positive electrode active material was weighed and placed into a digestion tank.

The digestion tank that contained the positive electrode active material sample was weighed with a precision of 0.0001 g 10 mL of aqua regia (a mixture of concentrated hydrochloric acid and concentrated nitric acid in a volume ratio of 3:1) was slowly added as a digestion reagent, the digestion tank was put in a MARS6 microwave digestion instrument from CEM company in USA, and a microwave emission frequency was adjusted to 2450 Hz to digest the sample; the digested liquid sample was transferred to an atomization chamber of an Optima 7000DV inductively coupled plasma-optical emission spectrometer (ICP-OES) from PerkinElmer, Inc. (PE for short) in USA, a radio frequency was set to 40.68 MHz, an argon output pressure was set to 0.6 MPa, and a radio frequency power was set to 1300 W to test the sample to obtain a characteristic spectrum; and an element type was determined based on a wavelength of the characteristic spectrum of the tested element, and an element concentration was determined based on intensity of the characteristic spectrum.

(4) Test of Valence Distribution of Element $M^1$ in the Positive Electrode Active Material in the "78% Delithiated State"

a. Determine the 78% Delithiated State

Eight button batteries were charged at 25° C. at a constant current of 1 C to the upper limit of the charge and discharge cut-off voltages, then charged at a constant voltage to a current less than or equal to 0.05 mA, after that, left standing for 2 minutes, and then discharged at a constant current of 1 C to the lower limit of the charge and discharge cut-off voltages.

After that, the foregoing charged and discharged eight button batteries were charged to 4.0 V, 4.1 V, 4.2 V, 4.3 V, 4.4 V, 4.5 V 4.6 V, 4.7 V at a rate of 0.1 C, respectively. Each charged button battery was taken and disassembled in a drying room to obtain a positive electrode plate as a sample. After the mass of the sample was weighed and recorded, the sample was placed into a digestion tank, and 10 mL of aqua regia as a digestion reagent was slowly added. The tank was closed and placed into the CEM-MARS6 microwave digestion instrument, and digestion was carried out at a microwave emission frequency of 2450 Hz. The digested sample solution was transferred to a volumetric flask, shaken well, and sampled. The sampled solution was placed into the 7000DV inductively coupled plasma-emission spectrometer (ICP-OES) sample introduction system from PE company in USA, then mass concentration tests for Li, O, Ni, Co, Mn and the doping element in the positive electrode active material were performed at 0.6 MPa argon pressure and 1300 W radio frequency power. Chemical formulas at each voltage were obtained through conversion based on the mass concentration of each element, and then delithiated states at each voltage were obtained. For example, a chemical formula obtained for the positive electrode active material at a voltage of 4.3 V was $Li_{0.22}Ni_{0.8}Co_{0.1}Mn_{0.1}O_2$, then a corresponding delithiated state was (1-0.22)×100%=78%, which means the battery voltage corresponding to the 78% delithiated state was 4.3 V.

The button batteries were separately charged at 25° C. at a rate of 0.1 C to voltages corresponding to the 78% delithiated state to obtain samples in the 78% delithiated state, and then the following operations were performed.

b. Valence State Determined by Using XPS (i) The battery cell in the 78% delithiated state was disassembled in a drying room to take out the whole positive electrode plate, the positive electrode plate was placed into a beaker, and an appropriate amount of high-purity anhydrous dimethyl carbonate DMC was added into the beaker. The DMC was renewed every 8 hours, and the positive electrode plate was consecutively cleaned for 3 times, then placed into a vacuum standing box in the drying room, and dried for 12 hours in a vacuum state (−0.096 MPa). The dried positive electrode plate was scraped and ground in a drying room with a blade, and approximately 50 mg of powder of the positive electrode active material was weighed and taken.

(ii) The surface of a piece of aluminum foil of approximately 2 cm×2 cm was wiped clean with acetone, a double-sided tape of approximately 1 cm×1 cm was cut out and pasted on the center of the aluminum foil, the powder sample was spread on the double-sided tape, and made evenly distributed across the entire double-sided tape with a clean stainless-steel sampling spoon. Another piece of aluminum foil clean with acetone was taken to cover the sample, and the entire piece was placed between two flat stainless-steel modules, and then pressed by using a tablet press at a pressure of about 10 MPa for 15 seconds.

(iii) The pressed sample was placed into the sample chamber of the escalab 250Xi X-ray photoelectron spectrometer from Thermo Fisher Scientific (Thermo) in USA, and a monochromatic Al Kα (hv=1486.6 eV) excitation source, X-ray power of 150 W, and a focusing spot 500 μm were set. The 2p or 3d spectrum of element $M_1$ was collected for peak fitting with XPSpeak software to determine the valence distribution of element $M^1$.

(5) Initial Gram Capacity Test of the Button Battery

The battery was charged at 25° C. at a constant current of 0.1 C to the upper limit of the charge and discharge cut-off voltages, then charged at a constant voltage to a current less than or equal to 0.05 mA, after that, left standing for 2 minutes, and then discharged at a constant current of 0.1 C to the lower limit of the charge and discharge cut-off voltages. The discharge capacity in this case was the initial gram capacity of the button battery.

(6) Test of Initial Gram Capacity of the Full Battery

The battery was charged at 25° C. at a constant current of ⅓ C to the upper limit of the charge and discharge cut-off voltages, then charged at a constant voltage to a current less than or equal to 0.05 mA, after that, left standing for 5 minutes, and then discharged at a constant current of ⅓ C to the lower limit of the charge and discharge cut-off voltages. The discharge capacity in this case was the initial gram capacity of the full battery.

(7) Test of High-Temperature Cycling Performance of the Full Battery

The battery was charged at 45° C. at a constant current of 1 C to the upper limit of the charge and discharge cut-off voltages, then charged at a constant voltage to a current less than or equal to 0.05 mA, after that, left standing for 5 minutes, and then discharged at a constant current of 1 C to the lower limit of the charge and discharge cut-off voltages. This was one charge-discharge cycle. The discharge capacity in this case was recorded as the discharge specific capacity $D_1$ at the first cycle. A total of 400 charge-discharge cycles were performed on the battery according to the foregoing method, and a discharge specific capacity $D_{400}$ at the $400^{th}$ cycle was recorded.

Capacity retention rate of full battery after 400 cycles at 45° C. and 1C/1C (%)=$D_{400}/D_1$×100%

(8) Test of High-Temperature Storage Performance of the Full Battery

The battery was charged at 25° C. at a constant current rate of 1 C to the upper limit of the charge and discharge cut-off voltages, then charged at a constant voltage to a current less than or equal to 0.05 mA, and a volume of the battery at that time was measured and denoted as $V_0$. Then the battery was placed into a constant-temperature box at 80° C. for storage for 10 days, and a volume of the battery after storage for 10 days was measured and denoted as $V_1$. In this test, the drainage method was used to measure the volume of the battery.

Volume swelling rate $\Delta V$ of full battery after storage at 80° C. for 10 days (%)=$(V_1-V_0)/V_0$×100%

In the tests (4) to (8):

In Examples 1 to 34 and Comparative Examples 1 to 7, the charge/discharge cut-off voltage of the button battery ranged from 2.8 V to 4.25 V, and the charge/discharge cut-off voltage of the full battery ranged from 2.8 V to 4.2 V.

In Examples 35 to 36 and Comparative Examples 8 to 10, the charge/discharge cut-off voltage of the button battery ranged from 2.8 V to 4.35 V, and the charge/discharge cut-off voltage of the full battery ranged from 2.8 V to 4.3 V.

TABLE 1-1

| Number | M¹ | M² | Concentration of M¹ (ppm) | Total concentration of M¹ and M² (ppm) | Mass ratio | First sintering Temperature (° C.) | First sintering Duration (h) | Second sintering Temperature (° C.) | Second sintering Duration (h) | Third sintering Temperature (° C.) | Third sintering Duration (h) |
|---|---|---|---|---|---|---|---|---|---|---|---|
| Example 1 | Sb | Al | 3500 | 6500 | 50:50 | 820 | 10 | 820 | 6 | 345 | 7 |
| Example 2 | Te | Y | 3200 | 5300 | 45:55 | 820 | 10 | 820 | 6 | 345 | 7 |
| Example 3 | W | Zf | 4000 | 7400 | 52:48 | 820 | 10 | 820 | 6 | 345 | 7 |
| Example 4 | Nb | Ti | 3500 | 7200 | 55:45 | 820 | 10 | 820 | 6 | 345 | 7 |
| Example 5 | Sb | Zr | 3400 | 6800 | 50:50 | 820 | 10 | 820 | 6 | 345 | 7 |
| Example 6 | Ti | Ti | 3800 | 7500 | 53:47 | 820 | 10 | 820 | 6 | 345 | 7 |
| Example 7 | Sb + W | Al | 4200 | 7600 | 45:55 | 820 | 10 | 820 | 6 | 345 | 7 |
| Example 8 | Sb | Al + Zr | 3500 | 7200 | 53:47 | 820 | 10 | 820 | 6 | 345 | 7 |
| Example 9 | Sb | Al | 200 | 3200 | 52:48 | 820 | 10 | 820 | 6 | 345 | 7 |
| Example 10 | Sb | Al | 1000 | 4000 | 50:50 | 820 | 10 | 820 | 6 | 345 | 7 |
| Example 11 | Sb | Al | 2000 | 5000 | 45:55 | 820 | 10 | 820 | 6 | 345 | 7 |
| Example 12 | Sb | Al | 4800 | 7800 | 55:45 | 820 | 10 | 820 | 6 | 345 | 7 |
| Example 13 | Sb | Al | 6000 | 10000 | 52:48 | 820 | 10 | 820 | 6 | 345 | 7 |
| Example 14 | Sb | Al | 8000 | 12000 | 55:45 | 820 | 10 | 820 | 6 | 345 | 7 |
| Example 15 | Sb | Al | 3000 | 11000 | 45:55 | 820 | 10 | 820 | 6 | 345 | 7 |
| Example 16 | Sb | Al | 500 | 1000 | 53:47 | 820 | 10 | 820 | 6 | 345 | 7 |
| Example 17 | Ru | Mg | 3500 | 7000 | 50:50 | 820 | 10 | 820 | 6 | 345 | 7 |
| Example 18 | Ru | Mg | 3400 | 7000 | 52:48 | 710 | 5 | 680 | 4 | 345 | 7 |
| Example 19 | Ti | Ti | 3400 | 7000 | 45:55 | 950 | 15 | 930 | 12 | 345 | 7 |
| Example 20 | V | Zr | 3500 | 7000 | 53:47 | 750 | 5 | 680 | 4 | 345 | 7 |
| Example 21 | Nb | B | 3200 | 5900 | 50:50 | 720 | 6 | 700 | 5 | 345 | 7 |
| Example 22 | Nb | B | 3300 | 6100 | 52:48 | 820 | 10 | 820 | 6 | 345 | 7 |
| Example 23 | Nb | B | 3400 | 6000 | 45:55 | 950 | 13 | 930 | 12 | 345 | 7 |
| Example 24 | Nb | B | 3300 | 6100 | 53:47 | 700 | 7 | 680 | 5 | 345 | 7 |
| Example 25 | Nb | B | 3300 | 6200 | 50:50 | 1000 | 18 | 950 | 16 | 345 | 7 |
| Example 26 | Sb | Al | 3400 | 7000 | 52:48 | 930 | 15 | 910 | 13 | 380 | 7 |
| Example 27 | Sb | Al | 3500 | 7100 | 55:45 | 880 | 14 | 870 | 13 | 355 | 6 |
| Example 28 | Si | Ca | 3400 | 7000 | 52:48 | 700 | 5 | 710 | 4 | 320 | 6 |
| Example 29 | Si | Ca | 3500 | 7000 | 55:45 | 680 | 5 | 650 | 3 | 300 | 7 |
| Example 30 | Te | B | 3200 | 6200 | 50:50 | 820 | 10 | 820 | 6 | 345 | 7 |
| Example 31 | Te | B | 3100 | 6300 | 53:47 | 820 | 10 | 820 | 6 | 345 | 7 |
| Example 32 | Te | B | 3200 | 6100 | 45:55 | 820 | 10 | 820 | 6 | 345 | 7 |
| Example 33 | W | Zr | 4000 | 7400 | 55:45 | 700 | 4 | 670 | 3 | 345 | 7 |
| Example 34 | W | Zr | 4000 | 7300 | 52:48 | 630 | 3 | 550 | 7 | 345 | 7 |
| Comparative Example 1 | / | / | / | / | / | One sintering treatment at 820° C. for 16 hours | | | | / | / |
| Comparative Example 2 | / | Al | / | 3000 | / | One sintering treatment at 820° C. for 16 hours | | | | 345 | 7 |
| Comparative Example 3 | Al | / | 3000 | / | 55:45 | 820 | 10 | 820 | 6 | / | / |
| Comparative Example 4 | Al | Al | 3000 | 6000 | 53:47 | 820 | 10 | 820 | 6 | 345 | 7 |
| Comparative Example 5 | V | Zr | 3500 | 7000 | 50:50 | 710 | 4 | 660 | 3 | 345 | 7 |
| Comparative Example 6 | Ti | Ti | 3400 | 7000 | 52:48 | 1100 | 20 | 1000 | 18 | 345 | 7 |
| Comparative Example 7 | Ru | Mg | 3500 | 7000 | 45:55 | 650 | 3 | 600 | 2 | 345 | 7 |
| Example 35 | Sb | Al | 3000 | 6000 | 55:45 | 800 | 9 | 800 | 7 | 320 | 6 |
| Example 35 | Ru | Y | 3000 | 6000 | 50:50 | 800 | 9 | 800 | 7 | 320 | 6 |
| Comparative Example 8 | / | / | / | / | / | One sintering treatment at 800° C. for 16 hours | | | | / | / |
| Comparative Example 9 | / | Al | / | 3000 | / | One sintering treatment at 800° C. for 16 hours | | | | 320 | 6 |
| Comparative Example 10 | Al | / | 3000 | 3900 | 50:50 | 800 | 9 | 800 | 7 | / | / |

TABLE 1-2

| Number | σ (%) | ε (%) | Valence distribution of M¹ in 78% delithiated state | $D_v50$ (μm) | κ per μm² | Specific surface area (m²/g) | Compacted density (g/cm³) |
|---|---|---|---|---|---|---|---|
| Example 1 | 9 | 12 | +3, +5 | 13 | 30 | 0.6 | 3.8 |
| Example 2 | 11 | 13 | +4, +6 | 14 | 31 | 0.7 | 3.4 |
| Example 3 | 8 | 10 | +6 | 10 | 29 | 0.5 | 3.3 |
| Example 4 | 6 | 10 | +4, +5 | 13 | 28 | 0.7 | 3.7 |
| Example 5 | 11 | 14 | +3, +5 | 11 | 30 | 0.6 | 3.9 |
| Example 6 | 10 | 9 | +4 | 12 | 31 | 0.8 | 3.5 |
| Example 7 | 13 | 11 | +3, +5, +6 | 13 | 32 | 0.9 | 3.8 |

TABLE 1-2-continued

| Number | σ (%) | ε (%) | Valence distribution of $M^1$ in 78% delithiated state | $D_v50$ (μm) | κ per μm² | Specific surface area (m²/g) | Compacted density (g/cm³) |
|---|---|---|---|---|---|---|---|
| Example 8 | 8 | 7 | +3, +5 | 9 | 35 | 0.4 | 3.6 |
| Example 9 | 7 | 8 | +3, +5 | 12 | 33 | 0.3 | 3.7 |
| Example 10 | 11 | 12 | +3, +5 | 11 | 38 | 0.5 | 3.5 |
| Example 11 | 7 | 9 | +3, +5 | 14 | 36 | 0.8 | 3.6 |
| Example 12 | 11 | 9 | +3, +5 | 10 | 35 | 0.6 | 3.8 |
| Example 13 | 13 | 11 | +3, +5 | 11 | 34 | 0.5 | 3.6 |
| Example 14 | 17 | 15 | +3, +5 | 12 | 33 | 0.6 | 3.4 |
| Example 15 | 12 | 10 | +3, +5 | 10 | 36 | 0.5 | 3.7 |
| Example 16 | 8 | 9 | +3, +5 | 8 | 35 | 0.7 | 3.5 |
| Example 17 | 8 | 8 | +8 | 11 | 23 | 0.6 | 3.6 |
| Example 18 | 20 | 17 | +8 | 12 | 21 | 0.7 | 3.4 |
| Example 19 | 13 | 11 | +4 | 10 | 5 | 0.5 | 3.3 |
| Example 20 | 14 | 12 | +4, +5 | 10 | 50 | 0.5 | 3.4 |
| Example 21 | 10 | 9 | +4, +5 | 6 | 41 | 0.6 | 3.8 |
| Example 22 | 12 | 11 | +4, +5 | 14 | 38 | 0.4 | 3.5 |
| Example 23 | 10 | 10 | +4, +5 | 20 | 42 | 0.6 | 3.4 |
| Example 24 | 11 | 10 | +4, +5 | 3 | 40 | 0.8 | 3.9 |
| Example 25 | 12 | 13 | +4, +5 | 25 | 40 | 0.8 | 3.6 |
| Example 26 | 9 | 8 | +3, +5 | 15 | 25 | 0.1 | 3.5 |
| Example 27 | 11 | 10 | +3, +5 | 13 | 29 | 0.2 | 3.5 |
| Example 28 | 12 | 14 | +4 | 11 | 31 | 1.0 | 3.6 |
| Example 29 | 15 | 13 | +4 | 10 | 35 | 1.5 | 3.7 |
| Example 30 | 11 | 10 | +4, +6 | 13 | 25 | 0.6 | 3.8 |
| Example 31 | 10 | 11 | +4, +6 | 12 | 27 | 0.5 | 3.3 |
| Example 32 | 12 | 12 | +4, +6 | 12 | 25 | 0.7 | 3.0 |
| Example 33 | 15 | 30 |  | 11 | 26 | 0.6 | 3.3 |
| Example 34 | 18 | 47 | +6 | 10 | 25 | 0.6 | 3.2 |
| Comparative Example 1 | / | / | / | 12 | 28 | 0.7 | 3.5 |
| Comparative Example 2 | / | / | / | 13 | 29 | 0.6 | 3.4 |
| Comparative Example 3 | 8 | 9 | +3 | 11 | 30 | 0.8 | 3.5 |
| Comparative Example 4 | 10 | 9 | +3 | 12 | 29 | 0.5 | 3.6 |
| Comparative Example 5 | 14 | 13 | +4, +5 | 11 | 60 | 0.6 | 3.5 |
| Comparative Example 6 | 12 | 11 | +4 | 10 | 7 | 0.5 | 3.3 |
| Comparative Example 7 | 32 | 20 | +8 | 9 | 77 | 0.5 | 3.7 |
| Example 35 | 12 | 11 | +3, +5 | 12 | 30 | 0.7 | 3.6 |
| Example 36 | 11 | 10 | +8 | 13 | 31 | 0.6 | 3.7 |
| Comparative Example 8 | / | / | / | 11 | 30 | 0.5 | 3.8 |
| Comparative Example 9 | / | / | / | 9 | 31 | 0.6 | 3.7 |
| Comparative Example 10 | 7 | 8 | +3 | 10 | 32 | 0.4 | 3.8 |

TABLE 2

| Number | Initial gram capacity of button battery (mAh/g) | Initial gram capacity of full battery (mAh/g) | Cycling capacity retention rate of full battery (%) | ΔV at 80° C. for 10 days (%) |
|---|---|---|---|---|
| Example 1 | 208.4 | 198.3 | 93.28 | 3.9 |
| Example 2 | 206.7 | 196.2 | 91.02 | 5.1 |
| Example 3 | 207.6 | 197.0 | 92.19 | 7.3 |
| Example 4 | 206.0 | 197.7 | 91.57 | 6.7 |
| Example 5 | 205.7 | 196.1 | 93.01 | 4.5 |
| Example 6 | 207.7 | 197.3 | 93.24 | 4.1 |
| Example 7 | 207.0 | 198.0 | 97.97 | 3.4 |
| Example 8 | 206.2 | 198.9 | 92.88 | 3.1 |
| Example 9 | 202.4 | 193.9 | 85.60 | 16.7 |
| Example 10 | 205.6 | 196.6 | 88.90 | 11.8 |
| Example 11 | 208.5 | 197.9 | 93.14 | 4.5 |
| Example 12 | 207.9 | 196.2 | 91.84 | 12.0 |
| Example 13 | 203.7 | 192.8 | 84.59 | 13.7 |
| Example 14 | 202.0 | 192.1 | 83.97 | 14.9 |
| Example 15 | 202.6 | 192.4 | 83.25 | 13.9 |
| Example 16 | 202.8 | 192.5 | 83.14 | 18.8 |
| Example 17 | 207.1 | 197.7 | 92.43 | 4.6 |
| Example 18 | 203.7 | 193.2 | 85.69 | 20.5 |
| Example 19 | 204.1 | 194.6 | 89.15 | 18.4 |
| Example 20 | 205.6 | 195.3 | 88.07 | 20.3 |
| Example 21 | 204.9 | 195.0 | 86.42 | 32.6 |
| Example 22 | 207.1 | 197.9 | 92.10 | 11.4 |
| Example 23 | 204.2 | 195.2 | 87.54 | 27.3 |
| Example 24 | 201.6 | 190.8 | 81.78 | 41.7 |
| Example 25 | 202.7 | 193.7 | 85.61 | 28.7 |
| Example 26 | 203.1 | 193.4 | 85.01 | 22.7 |
| Example 27 | 203.2 | 193.6 | 84.53 | 25.9 |
| Example 28 | 203.5 | 194.1 | 83.24 | 30.4 |
| Example 29 | 203.7 | 194.0 | 82.11 | 34.1 |
| Example 30 | 206.7 | 196.7 | 91.57 | 10.4 |

TABLE 2-continued

| Number | Initial gram capacity of button battery (mAh/g) | Initial gram capacity of full battery (mAh/g) | Cycling capacity retention rate of full battery (%) | $\Delta V$ at 80° C. for 10 days (%) |
|---|---|---|---|---|
| Example 31 | 203.5 | 194.2 | 86.78 | 75.4 |
| Example 32 | 199.8 | 189.6 | 83.60 | 24.9 |
| Example 33 | 203.4 | 192.8 | 88.53 | 28.6 |
| Example 34 | 200.9 | 191.1 | 82.41 | 31.5 |
| Comparative Example 1 | 198.6 | 187.7 | 81.00 | 58.3 |
| Comparative Example 2 | 198.1 | 187.6 | 82.56 | 29.1 |
| Comparative Example 3 | 198.8 | 187.4 | 81.69 | 37.5 |
| Comparative Example 4 | 199.3 | 189.1 | 83.18 | 21.2 |
| Comparative Example 5 | 202.4 | 193.3 | 84.67 | 26.1 |
| Comparative Example 6 | 201.8 | 191.7 | 83.81 | 23.5 |
| Comparative Example 7 | 201.1 | 192.0 | 81.33 | 22.4 |
| Example 35 | 176.3 | 172.8 | 94.24 | 3.0 |
| Example 36 | 175.8 | 172.2 | 93.61 | 3.8 |
| Comparative Example 8 | 171.4 | 169.2 | 83.35 | 38.9 |
| Comparative Example 9 | 171.1 | 168.9 | 85.16 | 15.7 |
| Comparative Example 10 | 171.7 | 169.7 | 84.27 | 24.3 |

From comparisons between Examples 1 to 34 and Comparative Examples 1 to 7, and between Examples 35 to 36 and Comparative Examples 8 to 10, it could be seen that when element $M^1$ was uniformly doped in the secondary particles of the lithium transition metal oxide, a coating layer of an oxide of element $M^2$ was applied on the exterior surface of each of the secondary particles, element $M^1$ and element $M^2$ were each selected from a specific element type, and the primary particles in the secondary particle had an appropriate size and distribution, allowing the lithium ion secondary battery to have relatively high energy density, high-temperature storage performance and high-temperature cycling performance.

It could be seen from comparisons between Examples 17 to 18 and Comparative Example 7 that when the relative deviation of local mass concentration of element $M^1$ in the secondary particles was less than 20%, doping evenness was better, the positive electrode active material had better overall performance, and therefore, the energy density, high-temperature storage performance and high-temperature cycling performance of the battery were obviously improved. When the relative deviation of local mass concentration of the doping element in the secondary particles was greater than 20%, lithium ion diffusion channels and barriers throughout the interior of the positive electrode active material particles were inconsistent, and structural stability and deformation resistance at each zone differed, resulting in uneven internal stress distribution inside the material. Zones with high internal stress are prone to cracking, so that fresh surfaces of the positive electrode active material were exposed and the impedance was increased, thereby deteriorating the capacity performance, high-temperature storage performance and high-temperature cycling performance of the battery.

It could be seen from comparisons of Examples 19 to 20 and Comparative Examples 5 to 6 that when the number of primary particles contained in the outermost layer of the secondary particle ranged from 5 per $\mu m^2$ to 50 per $\mu m^2$, the size and distribution of the primary particles were good in the secondary particle, which could further increase a specific capacity of the positive electrode active material, improving the energy density of the battery. In addition, when the number of primary particles contained in the outermost layer of the secondary particle ranged from 5 per $\mu m^2$ to 50 per $\mu m^2$, the mechanical strength of the positive electrode active material was relatively high, which could improve high-temperature storage performance and high-temperature cycling performance of the battery.

It could be seen from the results in Examples 9 to 16 that relatively low concentrations of element $M^1$ and element $M^2$ in the positive electrode active material had a minor improvement effect on the capacity performance, high-temperature storage performance and high-temperature cycling performance of the battery. However, when the concentration of element $M^1$ in the positive electrode active material exceeded 6000 ppm, and the total concentration of element $M^1$ and element $M^2$ in the positive electrode active material exceeded 10000 ppm, the bulk structure of the positive electrode active material was damaged, and the capacity performance, high-temperature storage performance and high-temperature cycling performance of the battery were also impaired.

It could be seen from the results in Examples 30 to 32 that when the compacted density of the positive electrode active material powder was more than 3.0 g/cm³ under the pressure of 5 tons, the battery had a relatively high energy density and the high-temperature cycling performance and high-temperature storage performance of the battery could also be improved.

It could be seen from the results in Examples 3, 33, and 34 that a deviation c of a mass concentration of the doping element $M^1$ in the positive electrode active material with respect to an average mass concentration of the doping element in the secondary particles was less than 30%, a relatively high proportion of element $M^1$ entered into the interior of the secondary particles, and then the improvement effect of element $M^1$ was fully exerted, so that the battery had relatively high energy density, high-temperature cycling performance and high-temperature storage performance.

It could be seen from the results in Examples 21 to 25 that when the volume median particle size $D_v50$ of the positive electrode active material was less than 6 μm, more side reactions on the surface of the positive electrode active material resulted in a relatively large amount of gas generated by the battery cell, the battery had relatively poor high-temperature cycling performance and high-temperature storage performance, and the capacity performance of the battery was also impaired; and when the volume median particle size $D_v50$ of the positive electrode active material was greater than 20 μm, the diffusion and migration performance of lithium ions in the particles was relatively poor, which adversely affected the performance of the battery It could be seen from the results in Examples 26 to 29 that when the specific surface area of the positive electrode active material was too large or too small, the capacity performance, high-temperature storage performance and high-temperature cycling performance of the battery were adversely affected.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A positive electrode active material, comprising secondary particles and a coating layer applied on an exterior surface of each of the secondary particles, wherein the secondary particle comprises a lithium transition metal oxide, the coating layer comprises an oxide of element $M^2$, and the positive electrode active material satisfies a chemical formula (1):

$$Li_{1+a}[Ni_xCo_pMn_zM^1{}_bM^2{}_c]O_{2-d}X_d \qquad \text{chemical formula (1)}$$

wherein in the chemical formula (1), $M^1$ is an element doped in a transition metal site of the lithium transition metal oxide, $M^1$ is selected from one or more of Si, Ti, Cr, Mo, V, Ge, Se, Zr, Ru, Rh, Pd, Sb, Te, Ce, and W, X is an element doped in an oxygen site of the lithium transition metal oxide, X is selected from one or more of F, Cl, Br, I, S, N, and P, $M^2$ is an element of the coating layer, $M^2$ is selected from one or more of Mg, Al, Ca, Ce, Ti, Zr, Zn, Y, and B, $0.55 \leq x < 1$, $0 < y \leq 0.3$, $0 \leq z \leq 0.3$, $-0.1 < a < 0.2$, $0 < b < 0.3$, $0 < c < 0.3$, $0 \leq d < 0.2$, $0 < b+c < 0.3$, and $x+y+z+b=1$;

a relative deviation of local mass concentration of element $M^1$ in the secondary particle is less than 20%; the secondary particles from the core to the exterior surface of the particle comprises a plurality of layers of primary particles arranged along radial direction of the secondary particle, and the number of primary particles contained in the outermost layer of the plurality of layers ranges from 5 per μm² to 50 per μm²;

wherein the relative deviation of local mass concentration of element $M^1$ in the secondary particle is calculated according to the following equation (3):

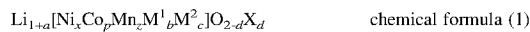

$$\sigma = \frac{\max\{|\eta_1 - \overline{\eta}|, |\eta_2 - \overline{\eta}|, |\eta_3 - \overline{\eta}|, \ldots, |\eta_n - \overline{\eta}|\}}{\overline{\eta}} \qquad (3)$$

2. The positive electrode active material according to claim 1, wherein a deviation ε of a concentration of element $M^1$ in the positive electrode active material with respect to an average mass concentration of element $M^1$ in the secondary particles satisfies ε<50.

3. The positive electrode active material according to claim 1, wherein a specific surface area of the positive electrode active material ranges from 0.1 m²/g to 1.5 m²/g.

4. The positive electrode active material according to claim 1, wherein a compacted density of the positive electrode active material under a pressure of 5 tons (equivalent to 49 kN) is more than 3.0 g/cm³.

5. The positive electrode active material according to claim 1, wherein a volume median particle size $D_v50$ of the positive electrode active material ranges from 3 μm to 25 μm.

6. The positive electrode active material according to claim 1, wherein a length of the primary particle ranges from 100 nm to 1000 nm, and a width of the primary particle ranges 50 nm to 400 nm.

7. The positive electrode active material according to claim 1, wherein an aspect ratio of the primary particle ranges from 2 to 20.

8. The positive electrode active material according to claim 1, wherein a concentration of element $M^1$ in the positive electrode active material ranges from 200 ppm to 8000 ppm; and a total concentration of element $M^1$ and element $M^2$ in the positive electrode active material ranges from 1000 ppm to 12000 ppm.

9. The positive electrode active material according to claim 1, wherein when the positive electrode active material is in a 78% delithiated state, element $M^1$ has a valence higher than +3; or when the positive electrode active material is in a 78% delithiated state, element $M^1$ has more than two different valence states, and element $M^1$ in the highest valence state has one or more valences of +4, +5, +6, +7, and +8.

10. The method according to claim 9 wherein valence of element $M^1$ in the positive electrode active material in the 78% delithiated state is determined using an X-ray photoelectron spectroscopy (XPS) analysis test.

11. The method according to claim 9 wherein valence of element $M^1$ in the positive electrode active material in the 78% delithiated state is determined using synchrotron radiation photoelectron spectroscopy (SRPES) analysis.

12. The positive electrode active material according to claim 1, wherein a deviation ε of a concentration of element $M^1$ in the positive electrode active material with respect to an average mass concentration of element $M^1$ in the secondary particles satisfies ε<is less than 30%.

13. The positive electrode active material according to claim 1, wherein an aspect ratio of the primary particle ranges from 5 to 15.

14. The positive electrode active material according to claim 1, wherein a concentration of element $M^1$ in the positive electrode active material ranges from 200 ppm to 6000 ppm; and a total concentration of element $M^1$ and element $M^2$ in the positive electrode active material ranges from 1000 ppm to 10000 ppm.

15. A lithium-ion secondary battery, comprising a positive electrode plate, wherein the positive electrode plate comprises a positive electrode current collector and a positive electrode active substance layer disposed on the positive electrode current collector, and the positive electrode active substance layer comprises the positive electrode active material according to claim 1.

16. A preparation method of a positive electrode active material, comprising the following steps:
(a) preparing a precursor of the positive electrode active material by the co-precipitation method, wherein a mixed solution is obtained by dispersing a Ni source, a Co source, and optionally an Mn source into a solvent; the mixed solution, a strong alkali solution, and a complexing agent solution are simultaneously pumped into a reactor with stirring function through continuous co-current reactions, where a pH value of the reaction solution is controlled to be 10 to 13, the temperature in the reactor ranges from 25° C. to 90° C., and inert gas is introduced for protection during the reaction; and after the reaction is completed, aging, filtering, washing, and vacuum drying are performed to obtain a hydroxide that contains Ni, Co, and optionally Mn;
(b) providing a mixture, wherein the mixture comprises the precursor of a positive electrode active material, a lithium source, a precursor of element $M^1$, and optionally a precursor of element X;
(c) subjecting the mixture to a sintering treatment to obtain secondary particles; and (d) mixing the secondary particles and a precursor of element $M^2$ and subjecting a resulting mixture to a sintering treatment, so as to obtain the positive electrode active material;

wherein the positive electrode active material comprises secondary particles and a coating layer applied on an exterior surface of each of the secondary particles, the secondary particle comprises a lithium transition metal oxide, the coating layer comprises an oxide of element $M^2$, and the positive electrode active material satisfies a chemical formula (1), $$Li_{1+a}[Ni_xCo_pMn_zM^1_bM^2_c]O_{2-d}X_d \qquad \text{chemical formula (1)}$$

wherein in the chemical formula (1), $M^1$ is an element doped in a transition metal site of the lithium transition metal oxide, $M^1$ is selected from one or more of Si, Ti, Cr, Mo, V, Ge, Se, Zr, Nb, Ru, Rh, Pd, Sb, Te, Ce, and W, X is an element doped in an oxygen site of the lithium transition metal oxide, X is selected from one or more of F, Cl, Br, I, S, N, and P, $M^2$ is an element of the coating layer, $M^2$ is selected from one or more of Mg, Al, Ca, Ce, Ti, Zr, Zn, Y, and B, $0.55 \leq x < 1$, $0 < y \leq 0.3$, $0 \leq z \leq 0.3$, $-0.1 < a < 0.2$, $0 < b < 0.3$, $0 < c < 0.3$, $0 \leq d < 0.2$, $0 < b+c < 0.3$, and $x+y+z+b=1$;

a relative deviation of local mass concentration of element $M^1$ in the secondary particle is less than 20%; and the secondary particle from the core to the exterior surface of the particle comprises a plurality of layers of primary particles arranged along radial direction of the secondary particle, and the number of primary particles contained in the outermost layer of the plurality of layers ranges from 5 per $\mu m^2$ to 50 per $\mu m^2$ wherein at least one of the following is further satisfied in the step (c):

an atmosphere for the sintering treatment is an atmosphere that contains oxygen; and optionally, a percentage of oxygen in the sintering atmosphere ranges from 80% to 100%;

a temperature for the sintering treatment ranges from 500° C. to 1000° C.; or duration for the sintering treatment ranges from 5 hours to 35 hours.

17. The method according to claim 16, wherein the precursor of element $M^1$ is divided into L batches for doping, wherein L ranges from 1 to 5, and the method comprises: mixing the precursor of the positive electrode active material, the lithium source, and a first batch of precursor of element $M^1$, and performing a first sintering treatment; mixing a product of the first sintering treatment with a second batch of precursor of element $M^1$, performing a second sintering treatment, and so on, until a product of an $(L-1)^{th}$ sintering treatment is mixed with an $L^{th}$ batch of precursor of element $M^1$; and performing an $L^{th}$ sintering treatment to obtain the secondary particles.

18. The method according to claim 17, wherein the precursor of element $M^1$ is equally or randomly divided into L parts to perform doping in L batches; optionally, the precursor of element $M^1$ is divided into 2 batches for doping; and optionally, a mass ratio of the first batch of precursor of element $M^1$ to the second batch of precursor of element $M^1$ is a ratio of 4060 to 6040.

19. The method according to claim 17, wherein a temperature for each sintering treatment ranges from 500° C. to 1000° C.; and duration for each sintering treatment ranges from 2 hours to 25 hours.

20. The method according to claim 16, wherein at least one of the following is further satisfied in the step (d):

an atmosphere for the sintering treatment is an atmosphere that contains oxygen; and optionally, a percentage of oxygen in the sintering atmosphere ranges from 80% to 100%;

a temperature for the sintering treatment ranges from 200° C. to 700° C.; or duration for the sintering treatment ranges from 2 hours to 10 hours.

* * * * *